United States Patent
Zhang et al.

(10) Patent No.: US 9,516,204 B2
(45) Date of Patent: Dec. 6, 2016

(54) ELECTRONIC DEVICE AND INFORMATION PROCESSING METHOD

(71) Applicants: BEIJING LENOVO SOFTWARE LTD., Beijing (CN); LENOVO (BEIJING) LIMITED, Beijing (CN)

(72) Inventors: Shipeng Zhang, Beijing (CN); Yanyong Li, Beijing (CN); Chuanbao Hong, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 14/755,174

(22) Filed: Jun. 30, 2015

(65) Prior Publication Data

US 2015/0304533 A1    Oct. 22, 2015

(30) Foreign Application Priority Data

Feb. 16, 2015 (CN) .......................... 2015 1 0084087
Feb. 16, 2015 (CN) .......................... 2015 1 0085327

(51) Int. Cl.
| | |
|---|---|
| H04N 7/14 | (2006.01) |
| H04N 5/225 | (2006.01) |
| H04N 5/232 | (2006.01) |
| G06F 3/00 | (2006.01) |
| G06F 1/16 | (2006.01) |
| G06F 3/042 | (2006.01) |

(52) U.S. Cl.
CPC .............. *H04N 5/2252* (2013.01); *G06F 1/16* (2013.01); *G06F 3/005* (2013.01); *G06F 3/0426* (2013.01); *H04N 5/2256* (2013.01); *H04N 5/23296* (2013.01); *H04N 7/142* (2013.01); *H04N 2007/145* (2013.01)

(58) Field of Classification Search
CPC ........ H04N 7/14; H04N 7/142; H04N 5/2252; H04N 5/2256; H04N 5/23296; H04N 2007/145; G06F 3/005
USPC .......................................... 348/14.01–14.16
See application file for complete search history.

(56) References Cited

U.S. PATENT DOCUMENTS

| | | | | |
|---|---|---|---|---|
| 9,195,265 B1* | 11/2015 | Jackson | ............... | G06F 1/1611 |
| 2007/0273752 A1* | 11/2007 | Chambers | ........... | H04M 1/0264 |
| | | | | 348/14.02 |
| 2009/0111515 A1* | 4/2009 | Joo | ..................... | H04M 1/0208 |
| | | | | 455/556.1 |

* cited by examiner

*Primary Examiner* — Melur Ramakrishnaiah

(57) ABSTRACT

The present disclosure provides an electronic device. The electronic device comprises: a main body comprising a first surface having a first display unit arranged thereon; and a movable portion comprising a second surface and movable from a first position to a second position with respect to the main body. The first surface and the second surface are both in a first plane when the movable portion is at the first position with respect to the main body. A first portion of the main body and the movable portion support the electronic device when the movable portion is at the second position with respect to the main body. The movable portion has an Input/Output (I/O) unit arranged thereon. Also provided is an information processing method applied in an electronic device.

18 Claims, 13 Drawing Sheets

1st Posture for 2nd Position

1st Posture for 2nd Position

2nd Posture for 2nd Position

1st Posture for 2nd Position

1st Posture for 2nd Position

2nd Posture for 2nd Position

ELECTRONIC DEVICE AND INFORMATION PROCESSING METHOD

TECHNICAL FIELD

The present disclosure relates to information processing, and more particularly, to an electronic device and an information processing method.

BACKGROUND

Electronic devices have increasingly powerful functions as they evolve. In particular, many applications, such as video applications and webpage applications, are installed in e.g., mobile phones or tablet computers. In different application scenarios, an electronic device may need to have different postures to better achieve different functions. However, conventional electronic devices, such as mobile phones or tablet computers, have bar shapes and thus limited postures. Hence, it is difficult for the electronic devices to meet different requirements in different application scenarios.

SUMMARY

In an aspect of the present disclosure, an electronic device is provided. The electronic device comprises: a main body comprising a first surface having a first display unit arranged thereon; and a movable portion comprising a second surface and movable from a first position to a second position with respect to the main body. The first surface and the second surface are both in a first plane when the movable portion is at the first position with respect to the main body, and a first portion of the main body and the movable portion support the electronic device when the movable portion is at the second position with respect to the main body. The movable portion has an Input/Output (I/O) unit arranged thereon.

In another aspect of the present disclosure, an information processing method is provided. The method is applied in an electronic device comprising a main body and a movable portion. The main body comprises a first surface having a first display unit arranged thereon. The movable portion comprises a second surface and movable from a first position to a second position with respect to the main body. The movable portion has an Input/Output (I/O) unit arranged thereon. The method comprises: detecting the position of the movable portion with respect to the main body, wherein the first surface and the second surface are both in a first plane when the movable portion is at the first position with respect to the main body, and a first portion of the main body and the movable portion support the electronic device when the movable portion is at the second position with respect to the main body, and activating the I/O unit in response to detecting that the movable portion is at the second position with respect to the main body.

BRIEF DESCRIPTION OF THE DRAWINGS

FIGS. 1a-8a and 11a are schematic diagrams each showing a structure of an electronic device according to an embodiment of the present disclosure;

FIGS. 1b-4b and 8b are schematic diagrams each showing a structure of an electronic device according to another embodiment of the present disclosure;

FIGS. 5b-7b are flowcharts each illustrating an information processing method according to another embodiment of the present disclosure;

FIGS. 1c-5c and 8c are schematic diagrams each showing a structure of an electronic device according to yet another embodiment of the present disclosure.

DETAILED DESCRIPTION OF THE EMBODIMENTS

Figure 1A:
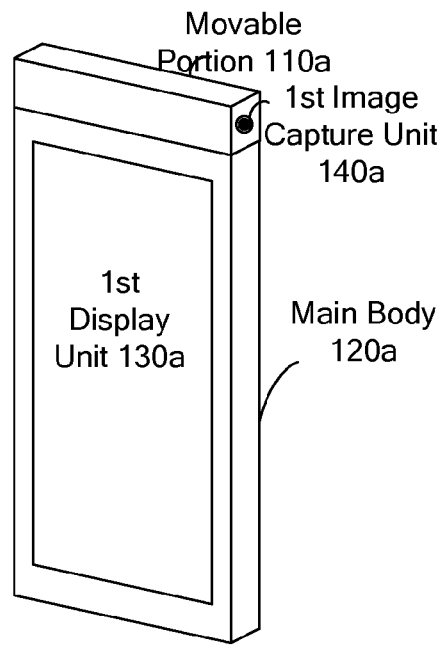

In the following, the technical solutions according to the present disclosure will be described in detail with reference to the figures and embodiments.

Image Capture Unit as I/O Unit

First Device Embodiment

As shown in FIGS. 1a-3a, an electronic device is provided in this embodiment. The electronic device includes a movable portion 110a and a main body 120a.

The main body 120a includes a first surface having a first display unit 130a. The movable portion 110a includes a second surface and movable from a first position to a second position with respect to the main body 120a. The first surface and the second surface are both in a first plane when the movable portion 110a is at the first position with respect to the main body 120a. A first portion of the main body 120a and the movable portion 110a can support the electronic device when the movable portion 110a is at the second position with respect to the main body 120a.

The movable portion 110a has a first image capture unit 140a provided on its first end surface adjacent to the second surface for capturing an image.

The electronic device can be a mobile phone, a tablet computer, an e-book, an electronic digital assistant, or the like.

The first display unit 130a can be a Liquid Crystal Display (LCD) unit having a LCD screen or an e-ink display having an e-ink screen.

In this embodiment, the volume of the main body 120a is typically larger than that of the movable portion 110a. The surface of the main body 120a is also larger than that of the movable portion 120a. The number of functional units provided in the main body 120a is greater than the number of functional units provided in the movable portion 110a. Further, the functional complexity of the main body 120a may also be higher than that of the movable portion 110a.

Figure 2A:
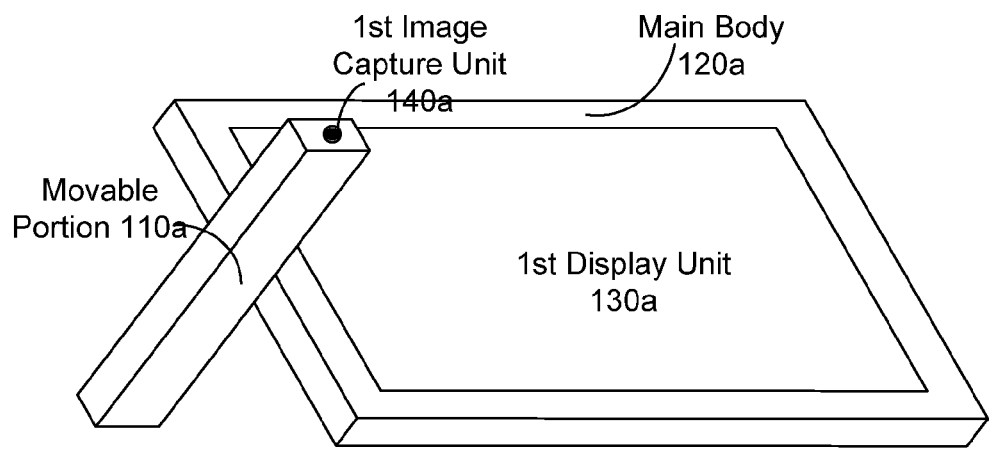
Figure 3A:
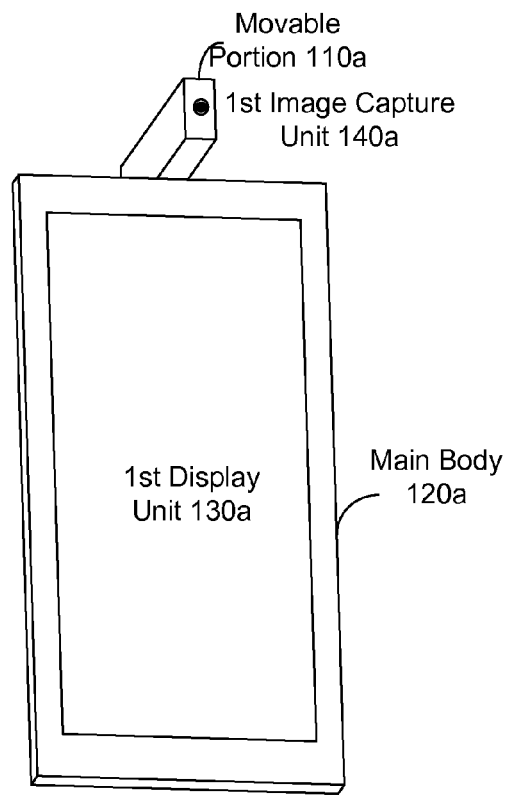

FIG. 1a is a schematic diagram showing the movable portion 110a being at the first position with respect to the main body 120a. FIGS. 2a and 3a are schematic diagrams each showing the movable portion 110a being at the second position with respect to the main body 120a. The first image capture unit 130a can be provided on any of the surfaces of the movable portion 110a and, in the case as shown in FIGS. 1a-3a, is provided on a first end surface at an end of the movable portion 110a. The first end surface is a surface of an end adjacent to the second surface. The first end surface can be a plane as shown in FIGS. 1a-3a, or can be any of various curved or folded faces.

The first image capture unit 140a can be in particular a functional unit having an image capture function and capable of generating images and/or videos when activated, such as a camera or a video recorder.

As described above, this embodiment provides an electronic device including a movable portion 110a and a main body 120a. The movable portion 110a has a first image capture unit 140a installed therein and is capable of supporting the electronic device. With the relative movement between the movable portion 110a and the main body 120a, the postures of the electronic device can be diversified. Thus, the movable portion 110a achieves a number of functions, which allows the electronic device in this embodiment to have a sophisticated and compact structure. Meanwhile, with the structure allowing the relative movement between the movable portion 110a and the main body 120a, the postures of the electronic device can be diversified. In this way, different requirements on postures in different application scenarios can be met and the user's satisfaction can be improved.

Second Device Embodiment

As shown in FIGS. 1a-3a, an electronic device is provided in this embodiment. The electronic device includes a movable portion 110a and a main body 120a.

The main body 120a includes a first surface having a first display unit 130a. The movable portion 110a includes a second surface and movable from a first position to a second position with respect to the main body 120a. The first surface and the second surface are both in a first plane when the movable portion 110a is at the first position with respect to the main body 120. A first portion of the main body 120a and the movable portion 110a can support the electronic device when the movable portion 110a is at the second position with respect to the main body 120a. The movable portion 110a has a first image capture unit 140a provided on its first end surface adjacent to the second surface for capturing an image.

In particular, the first image capture unit 140a captures images when the movable portion 110a is at the second position with respect to the main body 120a.

In practice, the first image capture unit 140a can capture images, regardless of the relative position between the movable portion 110a and the main body 120a. However, in this embodiment, in order to improve the quality of the captured images, e.g., to avoid any ghost in the images captured by the electronic device when it is not stably supported while being in the first position. In this embodiment, it is preferable that the first image capture unit 140a captures images when the movable portion 110a is at the second position with respect to the main body 120a, so as to improve the quality of the captured images.

The electronic device has two postures when the movable portion 110a is at the second position with respect to the main body 120a. As shown in FIG. 2a, when the electronic device has the first posture, the movable portion 110a and a portion of the main body 120a that is parallel to a long side of the first surface of the electronic device support the electronic device. As shown in FIG. 3a, when the electronic device has the second posture, the movable portion 110a and a portion of the main body 120a that is parallel to a short side of the first surface of the electronic device support the electronic device.

In this embodiment, the first image capture unit 140a can capture images when electronic device has the first or second posture. Apparently, when the electronic device has the first or second posture, the first image capture unit 140a provided on the first end surface has a tilt angle with a supporting plane and the capturing direction faces exactly the user in front of the electronic device. In this case, the first image capture unit 140a provided on the first end surface is particularly suitable for selfie. In this way, the selfie operation is simpler and easier than the case where the electronic device is hand held and the user's selfie requirement can be satisfied.

Third Device Embodiment

As shown in FIGS. 1a-3a, an electronic device is provided in this embodiment. The electronic device includes a movable portion 110a and a main body 120a.

The main body 120a includes a first surface having a first display unit 130a. The movable portion 110a includes a second surface and movable from a first position to a second position with respect to the main body 120a. The first surface and the second surface are both in a first plane when the movable portion 110a is at the first position with respect to the main body 120. A first portion of the main body 120a and the movable portion 110a can support the electronic device when the movable portion 110a is at the second position with respect to the main body 120a. The movable portion 110a has a first image capture unit 140a provided on its first end surface adjacent to the second surface for capturing an image.

Figure 4A:
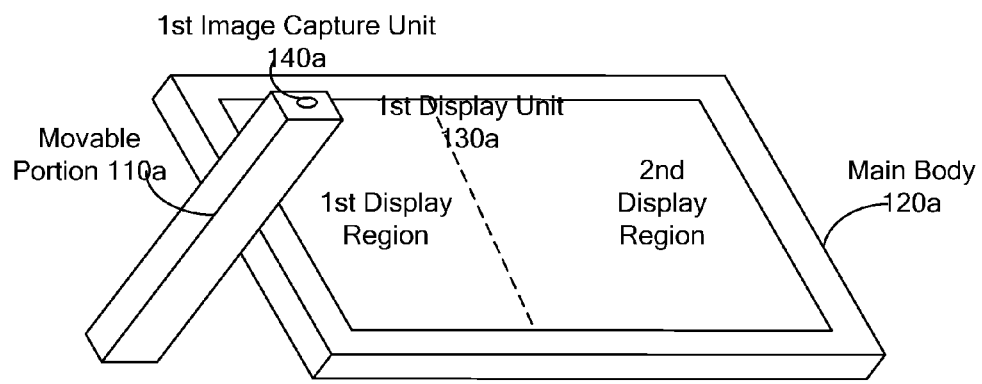

As shown in FIG. 4a, the electronic device further includes a communication unit configured to transmit a first image captured by the first capture unit to a second electronic device and receive a second image from the second electronic device.

The first display unit 130a includes a first display region for displaying the first image and a second display region for displaying the second image.

In particular, the communication unit can be a wired or wireless communication unit and. In this embodiment, it is preferably a wireless communication unit, which can include a transceiver antenna structure, such as WIFI antenna, Bluetooth antenna, mobile communication 2G, 3G, 4G or 5G antenna.

In this embodiment, the communication unit transmits the first image captured by the first capture unit to the second electronic device and receives the second image from the second electronic device when the electronic device and the second electronic device are in progress of a video communication.

The display region of the first display unit 130a is divided into a first display region and a second display region for displaying the first image and the second image, respectively. Obviously, the user can view both the image capture effect of the electronic device and the second image captured by the second electronic device, which is convenient to use.

As an improvement to this embodiment, the user may want to view the image effect of the first image captured by the electronic device while making the video call. More importantly, the user may want to view the image of a second user captured by the second electronic device. With this feature, in the embodiment shown in FIG. 4a, the display area of the first display region can be smaller than that of the second display region. Obviously, this better satisfies the user's requirements.

Fourth Device Embodiment

As shown in FIGS. 1a-3a, an electronic device is provided in this embodiment. The electronic device includes a movable portion 110a and a main body 120a.

The main body 120a includes a first surface having a first display unit 130a. The movable portion 110a includes a second surface and movable from a first position to a second position with respect to the main body 120*a*. The first surface and the second surface are both in a first plane when the movable portion 110*a* is at the first position with respect to the main body 120. A first portion of the main body 120*a* and the movable portion 110*a* can support the electronic device when the movable portion 110*a* is at the second position with respect to the main body 120*a*. The movable portion 110*a* has a first image capture unit 140*a* provided on its first end surface adjacent to the second surface for capturing an image.

As shown in FIGS. 2*a*-4*a*, the electronic device has a first posture or a second posture when the movable portion is at the second position.

As shown in FIGS. 2*a* and 4*a*, the first portion of the main body 120*a* and the movable portion 110*a* support the electronic device when the electronic device has the first posture. The first portion is a portion of the main body 120*a* that is parallel to a long side of the first surface.

As shown in FIG. 3*a*, a second portion of the main body 120*a* and the movable portion 110*a* support the electronic device when the electronic device has the second posture. The second portion is a portion of the main body 120*a* that is parallel to a short side of the first surface.

Obviously, the first and second portions are two different portions of the main body 120*a*.

This embodiment further defines the two postures the electronic device may have when the movable portion 110*a* is at the second position with respect to the main body 120*a*.

In an implementation, when the electronic device has the first posture, a first angle is formed between the movable portion 110*a* and the main body 120*a*. The first angle may be, but not limited to, an angle between 45° and 60°. When the electronic device has the second posture, a second angle is formed between the movable portion 110*a* and the main body 120*a*. The second angle may be approximately 90°. That is, the first and second angles are generally not equal to each other.

Fifth Device Embodiment

As shown in FIGS. 1*a*-4*a*, an electronic device is provided in this embodiment. The electronic device includes a movable portion 110*a* and a main body 120*a*.

The main body 120*a* includes a first surface having a first display unit 130*a*. The movable portion 110*a* includes a second surface and movable from a first position to a second position with respect to the main body 120*a*. The first surface and the second surface are both in a first plane when the movable portion 110*a* is at the first position with respect to the main body 120. A first portion of the main body 120*a* and the movable portion 110*a* can support the electronic device when the movable portion 110*a* is at the second position with respect to the main body 120*a*. The movable portion 110*a* has a first image capture unit 140*a* provided on its first end surface adjacent to the second surface for capturing an image.

As shown in FIGS. 2*a*-4*a*, the electronic device has a first posture or a second posture when the movable portion is at the second position.

As shown in FIGS. 2*a* and 4*a*, the first portion of the main body 120*a* and the movable portion 110*a* support the electronic device when the electronic device has the first posture. The first portion is a portion of the main body 120*a* that is parallel to a long side of the first surface.

As shown in FIG. 3*a*, a second portion of the main body 120*a* and the movable portion 110*a* support the electronic device when the electronic device has the second posture. The second portion is a portion of the main body 120*a* that is parallel to a short side of the first surface.

The first display unit 130*a* has a first display mode or a second display mode.

Figure 5A:
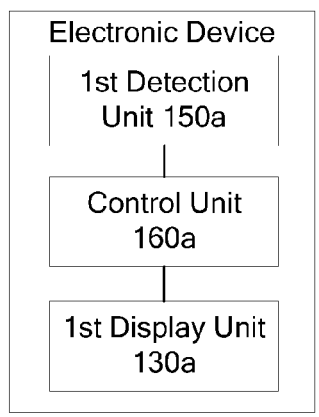

As shown in FIG. 5*a*, the electronic device further includes a first detection unit 150*a* and a control unit 160*a*.

The first detection unit 150*a* is configured to detect whether the electronic device has the first posture or the second posture.

The control unit 160*a* is configured to control the first display unit 130*a* to operate in the first display mode when the electronic device has the first posture or in the second display mode when the electronic device has the second posture.

This embodiment is based on the electronic device according to the above embodiments. At least two display modes are set for the first display unit 130*a* in association with different postures in different application scenarios, so as to better satisfy different requirements in different application scenarios.

In order to improve the intelligence of the electronic device, in this embodiment the first detection unit 150*a* is provided for detecting whether the electronic device has the first posture or the second posture.

The first detection unit 150*a* may include sensors (e.g., gyros) for detecting the positions of the movable portion 110*a* and the main body 120*a*, respectively. Then, the first detection unit 150*a* can determine whether the movable portion 110*a* has the first or second posture with respect to the main body 120*a* based on the detection results.

Further, the tilt of the electronic device varies depending on whether the movable portion 110*a* has the first or second posture with respect to the main body 120*a*. The detection unit may be an acceleration sensor or a speed sensor capable of detecting a direction of an acceleration or speed. Hence, the electronic device has an acceleration or speed when it is switched from one posture to another. A gyro can determine whether the electronic device currently has the first or second posture by detecting a movement parameter of the electronic device as the posture of the electronic device is changed. The first detection unit 150 may have different structures and is not limited to the above structure.

The control unit 160*a* can be a processor or a processing chip having control functions in the electronic device, e.g., Central Processing Unit (CPU), Application Processor (AP), Digital Signal Processor (DSP), Programmable Logic Array (PLA) or other structures having control functions.

As a further improvement to this embodiment, the first display unit 130*a* has a wider display width in a first direction than in a second direction when it is in the first display mode. The first direction is parallel to the long side of the first surface of the main body 120*a* and perpendicular to the second direction. The first display unit 130*a* has a narrower display width in the first direction than in the second direction when it is in the second display mode.

In this embodiment, the first display mode can also be referred to as a landscape display mode and the second display mode can also be referred to as a portrait display mode. In the landscape display mode, the width of the displayed picture is greater than its height. In the portrait display mode, the height of the displayed picture is greater than its width.

Obviously, in this embodiment the display mode of the first display unit can be adapted to the posture of the electronic device, which further improves the user's satisfaction with the electronic device.

Sixth Device Embodiment

As shown in FIGS. 1*a*-3*a*, an electronic device is provided in this embodiment. The electronic device includes a movable portion 110*a* and a main body 120*a*.

The main body 120*a* includes a first surface having a first display unit 130*a*. The movable portion 110*a* includes a second surface and movable from a first position to a second position with respect to the main body 120*a*. The first surface and the second surface are both in a first plane when the movable portion 110*a* is at the first position with respect to the main body 120. A first portion of the main body 120*a* and the movable portion 110*a* can support the electronic device when the movable portion 110*a* is at the second position with respect to the main body 120*a*. The movable portion 110*a* has a first image capture unit 140*a* provided on its first end surface adjacent to the second surface for capturing an image.

Figure 6A:
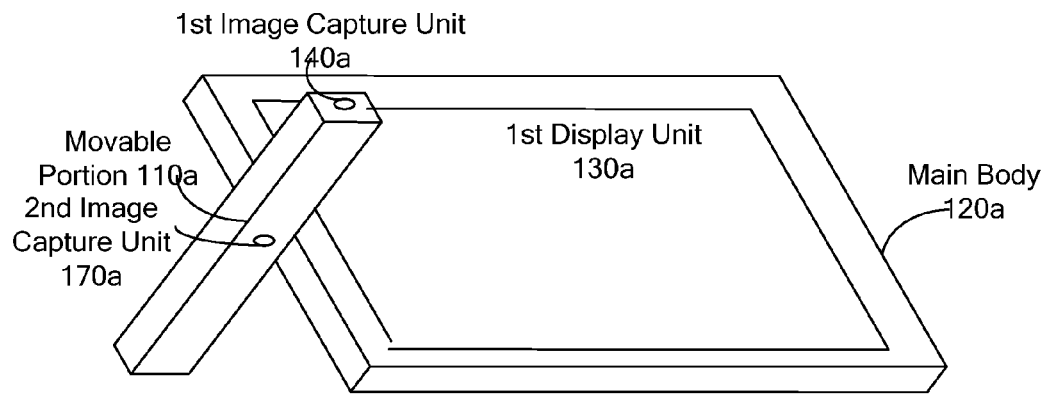

As shown in FIG. 6*a*, the movable portion 110*a* further includes a second image capture unit 170*a* that is provided at least partially on the second surface.

In this embodiment, the movable portion 110*a* further includes the second image capture unit 170*a* that can also be used for capturing an image. However, the second image capture unit 170*a* is particularly suitable for capturing an image when the movable portion 110*a* is at the first position with respect to the main body 120*a*. This is convenient for the user to capture images of scenes or humans when hand holding the electronic device.

Seventh Device Embodiment

As shown in FIGS. 1*a*-3*a*, an electronic device is provided in this embodiment. The electronic device includes a movable portion 110*a* and a main body 120*a*.

The main body 120*a* includes a first surface having a first display unit 130*a*. The movable portion 110*a* includes a second surface and movable from a first position to a second position with respect to the main body 120*a*. The first surface and the second surface are both in a first plane when the movable portion 110*a* is at the first position with respect to the main body 120. A first portion of the main body 120*a* and the movable portion 110*a* can support the electronic device when the movable portion 110*a* is at the second position with respect to the main body 120*a*. The movable portion 110*a* has a first image capture unit 140*a* provided on its first end surface adjacent to the second surface for capturing an image.

As shown in FIG. 6*a*, the movable portion 110*a* further includes a second image capture unit 170*a* that is provided at least partially on the second surface.

The first image capture unit 140*a* includes a first photosensitive unit and the second image capture unit 170*a* includes a second photosensitive unit. The electronic device further includes an imaging unit connected to the first and second photosensitive units.

Each of the first and second photosensitive units has a structure for collecting light. The imaging unit has a structure for generating an image from the light acquired by the first or second photosensitive unit.

In this embodiment, the first image capture unit 140*a* and the second image capture unit 170*a* share one single imaging unit, which simplifies the structure of the electronic device, reduces its hardware cost and its volume.

Eighth Device Embodiment

As shown in FIGS. 1*a*-3*a*, an electronic device is provided in this embodiment. The electronic device includes a movable portion 110*a* and a main body 120*a*.

The main body 120*a* includes a first surface having a first display unit 130*a*. The movable portion 110*a* includes a second surface and movable from a first position to a second position with respect to the main body 120*a*. The first surface and the second surface are both in a first plane when the movable portion 110*a* is at the first position with respect to the main body 120. A first portion of the main body 120*a* and the movable portion 110*a* can support the electronic device when the movable portion 110*a* is at the second position with respect to the main body 120*a*. The movable portion 110*a* has a first image capture unit 140*a* provided on its first end surface adjacent to the second surface for capturing an image.

Figure 7A:
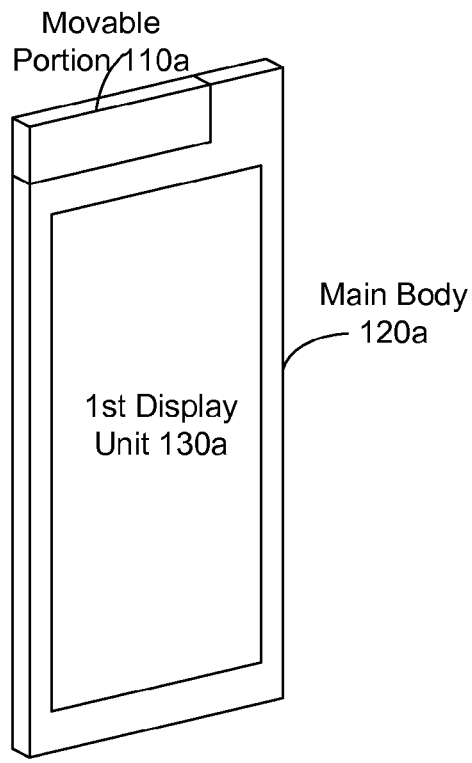

As shown in FIG. 7*a*, a long side of the second surface is not shorter than a half of the short side of the first surface.

This embodiment further defines that the long side of the first surface of the movable portion 110*a* is not shorter than a half of the short side of the main body 120*a*. Preferably, as shown in FIGS. 1*a*-4*a*, the long side of the second surface of the movable portion 110*a* has substantially the same length as the short side of the main body 120*a*.

The movable portion 110*a* and the main body 120*a* are rotatable in a second plane perpendicular to the first plane. Obviously, the movable portion 110*a* is movably connected to the main body 120*a* via a connector. When the movable portion 110*a* is rotated with respect to the main body 120*a*, a third surface where the movable portion 130*a* is interfaced with the main body is kept in the second plane. The short side of the first surface can be parallel to the second surface.

Figure 8A:
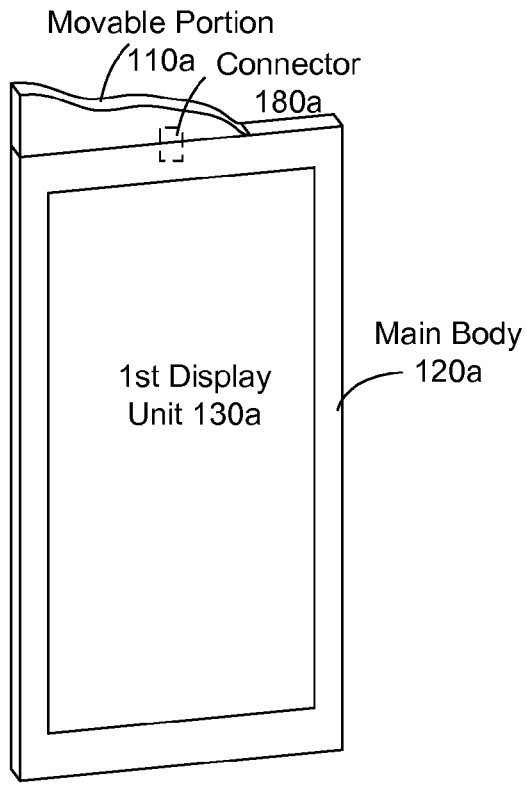

As a further improvement to this embodiment, as shown in FIG. 8*a*, the movable portion 110*a* is movably connected to the main body 120*a* via a connector 180 located at a middle position of the short side of the first surface.

In this embodiment, the connector is located at the middle position of the short side of the first surface, so as to support the electronic device more stably in the first and second postures.

It can be seen from FIGS. 7*a* and 8*a* that the movable portion 110*a* may have a regular bar shape as shown in FIG. 7*a*, or an irregular shape as shown in FIG. 8*a*. Obviously, this embodiment is not limited to any specific shape of the movable portion 110*a*.

Ninth Device Embodiment

As shown in FIGS. 1*a*-4*a* and 11*a*, an electronic device is provided in this embodiment. The electronic device is a first electronic device including a movable portion 110*a* and a main body 120*a*.

The main body 120*a* includes a first surface having a first display unit 130*a*. The movable portion 110*a* includes a second surface and movable from a first position to a second position with respect to the main body 120*a*. The movable portion 110*a* has a first image capture unit.

The electronic device further includes a second detection unit 210*a* configured to detect the position of the movable portion 110*a* with respect to the main body 120*a*. The first surface and the second surface are both in a first plane when the movable portion 110*a* is at the first position with respect to the main body 120*a*. A first portion of the main body 120*a* and the movable portion 110*a* support the electronic device when the movable portion 110*a* is at the second position with respect to the main body 120*a*.

The electronic device further includes a control unit 220*a* configured to activate the first image capture unit 140*a* to capture an image in response to detecting that the movable portion 110a is at the second position with respect to the main body 120a.

Here, the first electronic device can be a mobile phone, a tablet computer, an e-book, a personal digital assistant, or the like.

The second detection unit 210a can include various sensors capable of detecting the positional relation between the movable portion 110a and the main body 120a, e.g., a light sensor or a pressure sensor provided on an interface between the movable portion 110a and the main body 120a, or a gyro for detecting the positions of the movable portion 110a and the main body 120a, respectively. The second detection unit may have any of various structures and the details thereof will be omitted here.

The control unit can be any of various controllers or a processor or a processing chip having control functions, e.g., Central Processing Unit (CPU), Application Processor (AP), Digital Signal Processor (DSP), Programmable Logic Array (PLA) or other processors having control functions. The processor can execute specified instructions to perform the above operations of the control unit 220a.

The first electronic device in this embodiment provides a hardware implementation for the information processing methods according to the method embodiments. It also has advantages of high intelligence and high user satisfaction.

Tenth Device Embodiment

As shown in FIGS. 1a-4a and 11a, an electronic device is provided in this embodiment. The electronic device is a first electronic device including a movable portion 110a and a main body 120a.

The main body 120a includes a first surface having a first display unit 130a. The movable portion 110a includes a second surface and movable from a first position to a second position with respect to the main body 120a. The movable portion 110a has a first image capture unit arranged thereon.

The electronic device further includes a second detection unit 210a configured to detect the position of the movable portion 110a with respect to the main body 120a. The first surface and the second surface are both in a first plane when the movable portion 110a is at the first position with respect to the main body 120a. A first portion of the main body 120a and the movable portion 110a support the electronic device when the movable portion 110a is at the second position with respect to the main body 120a.

The electronic device further includes a control unit 220a configured to activate the first image capture unit 140a to capture an image in response to detecting that the movable portion 110a is at the second position with respect to the main body 120a.

The electronic device further includes a determination unit configured to determine whether the electronic device satisfies a first predetermined condition.

The control unit 220a is further configured to activate the first image capture unit in response to detecting that the movable portion 110a is at the second position with respect to the main body 120a and determining that the electronic device satisfies the first predetermined condition.

The determination unit can be a processor having a determination function. For the structure of the processor, reference can be made to the above embodiments and details thereof will be omitted here.

In this embodiment, the control unit 220a automatically activates the first image capture unit only when the movable portion 110a is at the second position with respect to the main body 120a and the electronic device satisfies the first predetermined condition. In this way, it is possible to reduce the phenomena where the first image capture unit 140a is unnecessarily activated, which further improves the intelligence of the first electronic device and the user's satisfaction.

The first electronic device can satisfy the first predetermined condition when the first electronic device has received a user instruction to activate a function related to image capture, e.g., for capturing a photo, capturing a video or making a video call. The first predetermined condition can be any predetermined condition and is not limited to the above condition. In particular, the determination unit is configured to determine whether the first electronic device has received a trigger event of making a video call with a second electronic device. The control unit 220a is configured to activate the first image capture unit 140a in response to detecting that the movable portion 110a is at the second position with respect to the main body 120a and determining that the trigger event of making the video call with the second electronic device has been received.

Here, the received trigger event of making the video call with the second electronic device can be a trigger event formed from a user instruction the first electronic device has received via a human-machine interface, or a video call event received from the second electronic device.

Obviously, the first electronic device in this embodiment can intelligently control the first image capture unit 140a to be automatically activated upon receiving the trigger event of making the video call with the second electronic device. Obviously, it has an advantage of high intelligence.

First Method Embodiment

According to this embodiment, an information processing method is provided. The method is applied in a first electronic device including a main body 110a and a movable portion 120a, as shown in FIGS. 1a-4a. The main body 110a includes a first surface having a first display unit 130a. The movable portion 120a includes a second surface and is movable from a first position to a second position with respect to the main body 120a.

The movable portion 110a has a first image capture unit 140a.

Figure 9A:
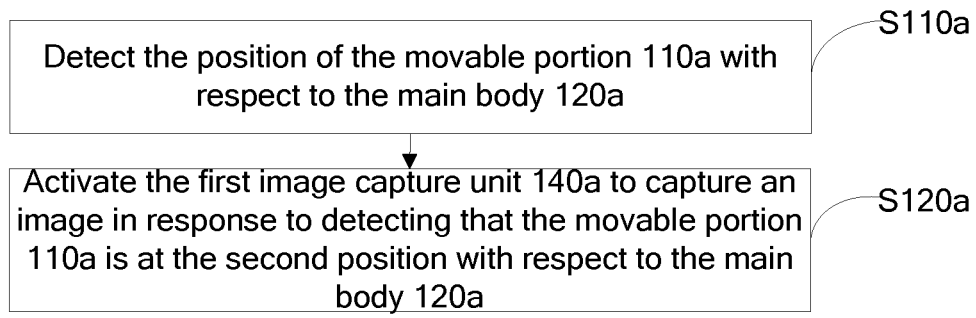
FIGS. 9a and 10a are flowcharts each illustrating an information processing method according to an embodiment of the present disclosure.

As shown in FIG. 9a, the method includes the following steps.

At step S110a, the position of the movable portion 110a with respect to the main body 120a is detected. The first surface and the second surface are both in a first plane when the movable portion 110a is at the first position with respect to the main body 120a. A first portion of the main body 120a and the movable portion 110a support the electronic device when the movable portion 110a is at the second position with respect to the main body 120a. The first image capture unit 140a is provided on a first end surface adjacent to the second surface of the movable portion 110a for capturing an image.

At step S120a, the first image capture unit 140a is activated to capture an image in response to detecting that the movable portion 110a is at the second position with respect to the main body 120a.

In the step S110a, the position of the movable portion 110a with respect to the main body 120a can be detected by using a sensor provided between the movable portion 110a and the main body 120a. For example, the sensor can be a light sensor or pressure sensor provided on an interface between the movable portion 110a and the main body 120a.

The light sensor may detect a minimum ambient brightness when the movable portion 110a is at the first position with respect to the main body 120a, and a maximum ambient brightness when the movable portion 110a is at the second position with respect to the main body 120a. Hence, the light sensor can determine the positional relation between the movable portion 110a and the main body 120a based on the detected ambient brightness.

The pressure sensor may detect a maximum pressure applied on it by the movable portion 110a and the main body 120a when the movable portion 110a is at the first position with respect to the main body 120a, and a minimum pressure applied on it by the movable portion 110a and the main body 120a when the movable portion 110a is at the second position with respect to the main body 120a. Hence, the pressure sensor can determine the positional relation between the movable portion 110a and the main body 120a based on the detected pressure.

In the step S120a, a control instruction, e.g., a signal to enable a processing chip corresponding to the first image capture unit 140a, can be generated to activate the first image capture unit, i.e., to switch it from an off state to an on state.

The information processing method according to this embodiment can be applied to the electronic device according to each of the above first to eighth device embodiments. The first image capture unit 140a can be activated automatically when the movable portion 110a is at the second position with respect to the main body 120a. Obviously, it is possible to better utilize the software and hardware resources in the electronic device, so as to improve the intelligence of the electronic device and the user's satisfaction.

For the description of the movable portion 110a, the main body 120a and the first display unit 130a, reference can be made to the above first to eighth device embodiments and details thereof will be omitted here.

Second Method Embodiment

According to this embodiment, an information processing method is provided. The method is applied in a first electronic device including a main body 110a and a movable portion 120a, as shown in FIGS. 1a-4a. The main body 110a includes a first surface having a first display unit 130a. The movable portion 120a includes a second surface and is movable from a first position to a second position with respect to the main body 120a. The movable portion 110a has a first image capture unit 140a arranged thereon.

As shown in FIG. 9a, the method includes the following steps.

At step S110a, the position of the movable portion 110a with respect to the main body 120a is detected. The first surface and the second surface are both in a first plane when the movable portion 110a is at the first position with respect to the main body 120a. A first portion of the main body 120a and the movable portion 110a support the electronic device when the movable portion 110a is at the second position with respect to the main body 120a. The first image capture unit 140a is provided on a first end surface adjacent to the second surface of the movable portion 110a for capturing an image.

At step S120a, the first image capture unit 140a is activated to capture an image in response to detecting that the movable portion 110a is at the second position with respect to the main body 120a.

Figure 10A:
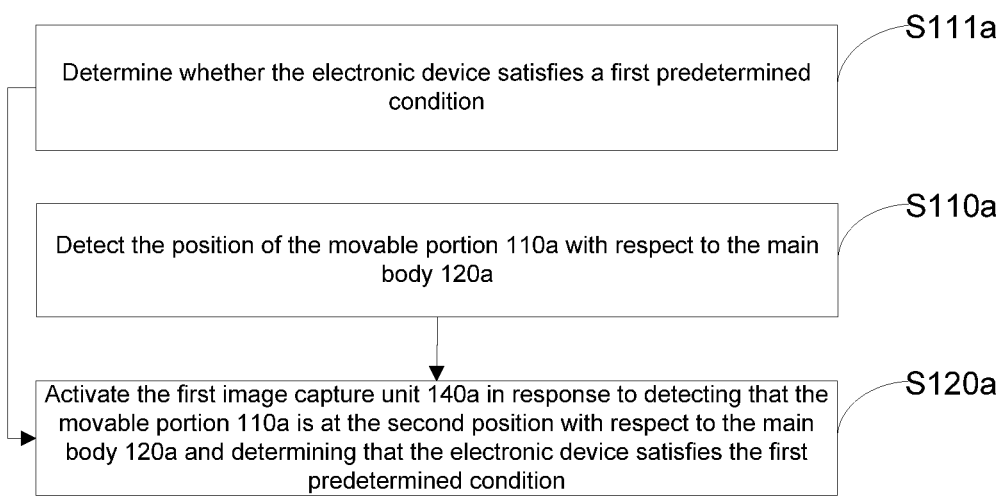
Figure 11A:
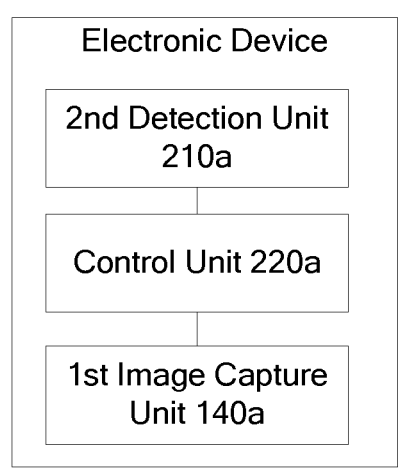

As shown in FIG. 10a, the method further includes the following steps.

At step S111a, it is determined whether the electronic device satisfies a first predetermined condition.

The step S120a can include: activating the first image capture unit 140a in response to detecting that the movable portion 110a is at the second position with respect to the main body 120a and determining that the electronic device satisfies the first predetermined condition.

The first electronic device can satisfy the first predetermined condition when a user instruction to perform an operation associated with an image capture application is detected, e.g., when the user initiates a camera application or a video capture or video call application. There may be other settings for the first predetermined condition and the present disclosure is not limited to the above one.

In this embodiment, the steps S111a and 110a are not necessarily performed in any specific order, as long as they are performed prior to the step S120a.

In this embodiment, the first image capture unit 140a is automatically activated only when the movable portion 110a is at the second position with respect to the main body 120a and the electronic device satisfies the first predetermined condition. In this way, it is possible to prevent the first image capture unit 140a from being unnecessarily activated.

Third Method Embodiment

According to this embodiment, an information processing method is provided. The method is applied in a first electronic device including a main body 110a and a movable portion 120a, as shown in FIGS. 1a-4a. The main body 110a includes a first surface having a first display unit 130a. The movable portion 120a includes a second surface and is movable from a first position to a second position with respect to the main body 120a. The movable portion 110a has a first image capture unit 140a arranged thereon.

As shown in FIG. 9a, the method includes the following steps.

At step S110a, the position of the movable portion 110a with respect to the main body 120a is detected. The first surface and the second surface are both in a first plane when the movable portion 110a is at the first position with respect to the main body 120a. A first portion of the main body 120a and the movable portion 110a support the electronic device when the movable portion 110a is at the second position with respect to the main body 120a. The first image capture unit 140a is provided on a first end surface adjacent to the second surface of the movable portion 110a for capturing an image.

At step S120a, the first image capture unit 140a is activated to capture an image in response to detecting that the movable portion 110a is at the second position with respect to the main body 120a.

As shown in FIG. 10a, the method further includes the following steps.

At step S111a, it is determined whether the electronic device satisfies a first predetermined condition.

The step S120a can include: activating the first image capture unit 140a in response to detecting that the movable portion 110a is at the second position with respect to the main body 120a and determining that the electronic device satisfies the first predetermined condition.

The step S111a can include determining whether the electronic device has received a trigger event of making a video call with a second electronic device.

The step S120 can include: activating the first image capture unit in response to detecting that the movable portion is at the second position with respect to the main body and determining that the electronic device has received the trigger event of making the video call with the second electronic device.

The first electronic device can make a video call with the second electronic device. If the user decides to make a video call with a second user of the second electronic device via the first and second electronic devices, it is necessary to use the image capture unit. The first electronic device in this embodiment reduces the troublesome manual operations by the user and improves the user's satisfaction. In this embodiment, it is detected whether the trigger event of making the video call with the second electronic device has been received and the first image capture unit is automatically activated if the detection result indicates that the trigger event has been received. Obviously, it is possible to better utilize the software and hardware resources in the first electronic device, so as to improve the intelligence of the first electronic device.

It is to be noted here that the received trigger event of making the video call with the second electronic device in this embodiment can be a trigger event formed from a user instruction the first electronic device has received via a human-machine interface, or a video call event received from the second electronic device.

Projection Unit as I/O Unit

First Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

Figure 5B:
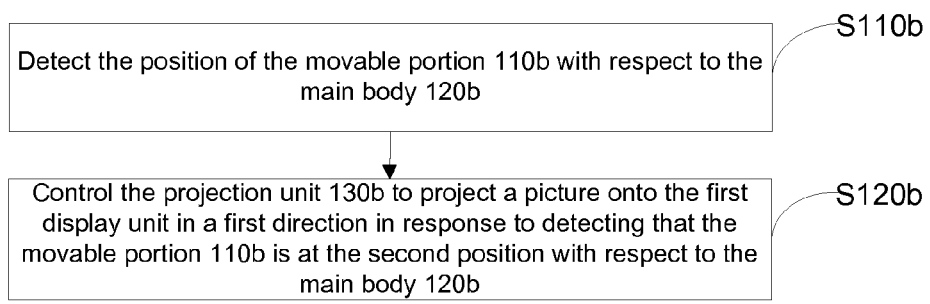

As shown in FIG. 5b, the method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

The electronic device can be a mobile phone, a tablet computer, an e-book, an electronic digital assistant, or the like.

The first display unit 130b can be a Liquid Crystal Display (LCD) unit having a LCD screen or an e-ink display having an e-ink screen.

In this embodiment, the volume of the main body 120b is typically larger than that of the movable portion 110b. The surface of the main body 120b is also larger than that of the movable portion 120b. The number of functional units provided in the main body 120b is greater than the number of functional units provided in the movable portion 110b.

Further, the functional complexity of the main body 120b may also be higher than that of the movable portion 110b.

Figure 1B:
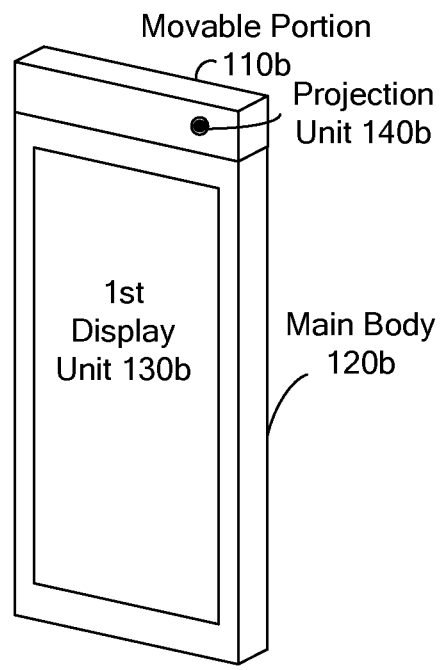
Figure 2B:
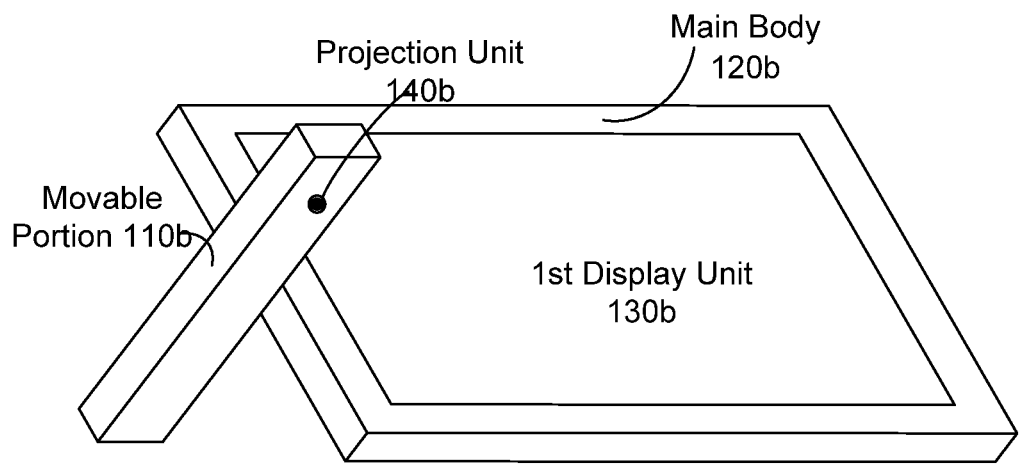
Figure 3B:
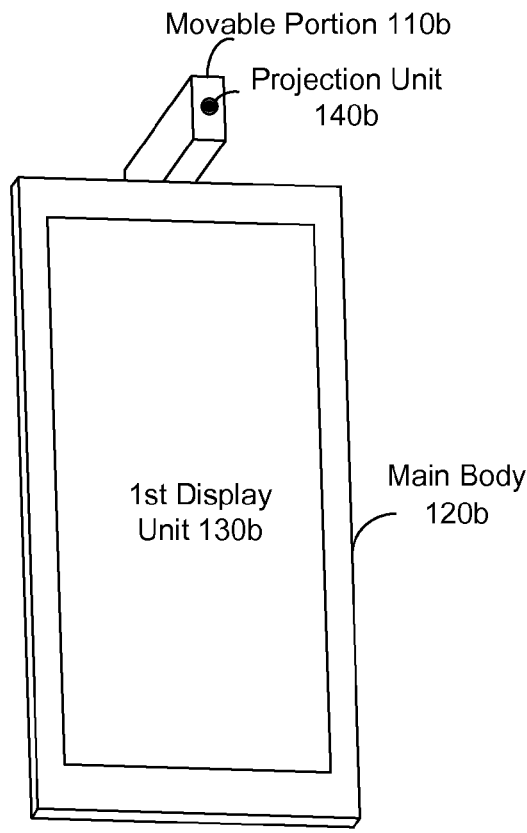
Figure 4B:
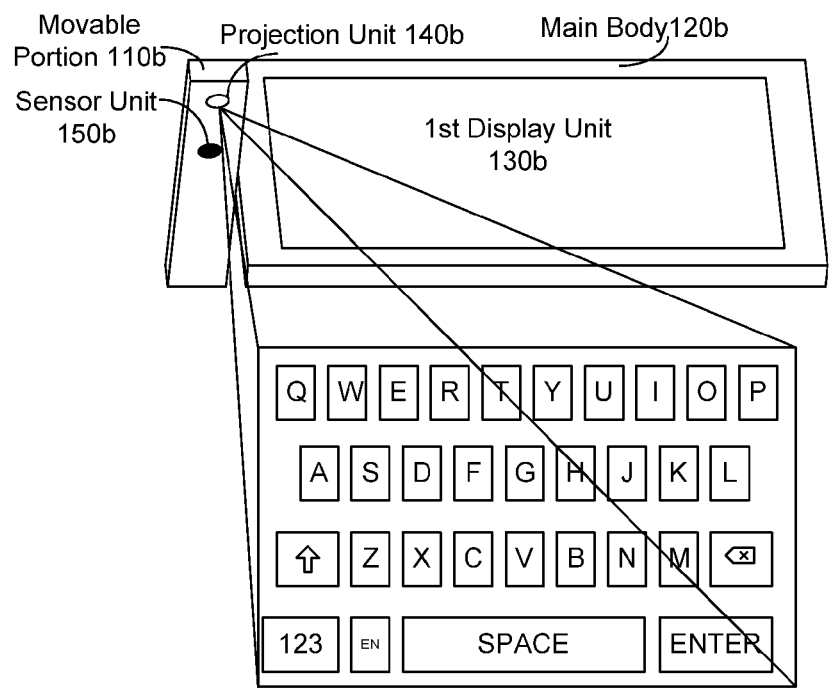

In this embodiment, the projection unit 140b can be located at any position on the movable portion 110b, e.g., on a second surface of the movable portion, as shown in FIGS. 1b, 2b and 4b, or on one of two end surfaces of the movable portion, as shown in FIG. 3b.

The projection unit 140b can have any structure capable of projecting a picture, which typically includes a projection light source and a set of lenses.

Here, the first predetermined direction can be any predetermined direction. In this embodiment, the first predetermined direction can be pointed to an area in front of the first display unit 130b, as shown in FIG. 4b.

In this embodiment, the projected picture may have any content, including e.g., texts, images, video or operation interface.

In this embodiment, the positional relation between the movable portion 110b and the main body 120b is changeable and, when the movable portion 110b is at the second position with respect to the main body 120b, the electronic device can be supported stably on a table, such that it can stably project a picture with a stable effect. The movable portion 110b has the projection unit 130b installed therein and is capable of supporting the main body 120b. Obviously, this portion achieves a number of functions and has a sophisticated structure. Meanwhile, the position of the projected picture in the first direction can be changed by changing the positional relation when the movable portion 110b is at the second position with respect to the main body 120b. In this way, different requirements in different application scenarios can be met and the user's satisfaction can be improved.

In this embodiment, a long side of the second surface of the movable portion 110b is not shorter than a half of the short side of the first surface of the main body 120b. For example, the length of the long side of the second surface is equal to that of the short side of first surface.

Second Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b. The method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

Here, the projection unit 140b is at least partially provided on the second surface.

The electronic device has two postures when the movable portion 110b is at the second position with respect to the main body 120b. As shown in FIGS. 2b and 4b, when the electronic device has the first posture, the movable portion 110b and a portion of the main body 120b that is parallel to a long side of the first surface of the electronic device support the electronic device. As shown in FIG. 3b, when the electronic device has the second posture, the movable portion 110b and a portion of the main body 120b that is parallel to a short side of the first surface of the electronic device support the electronic device. That is, the first portion can be located at the long side or short side of the first surface. In this embodiment, it is preferred that the first portion is a portion of the first long side. With this posture, the first display unit 130b is laterally supported on the supporting plane. In this way, in the information processing method according to this embodiment, the projected picture can be projected onto a supporting plane in front of the first display unit 130b, such that the user can conveniently view or compare the content displayed in the first display unit 130b and the content displayed in the projected picture.

It is to be noted here that the first portion can be located at the long side of the first surface.

Third Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 5b, the method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

Figure 6B:
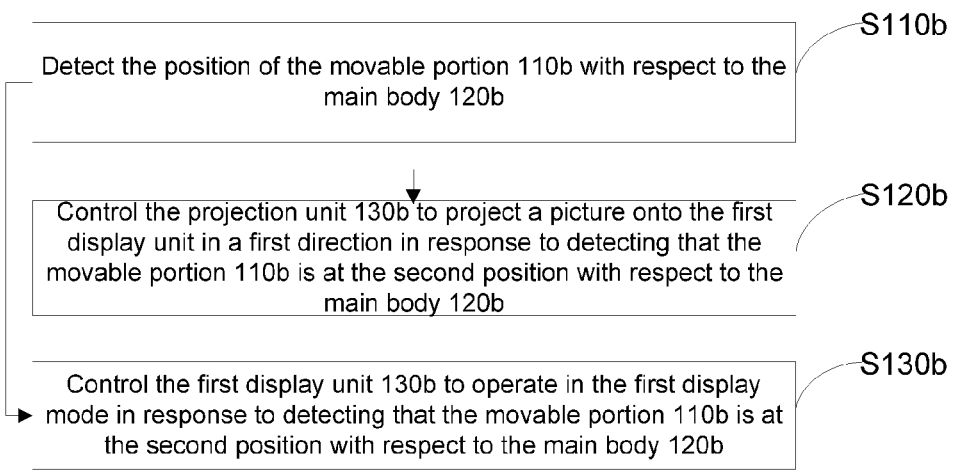

As a further improvement to this embodiment, the first display unit has a first display mode. As shown in FIG. 6b, the method further includes the following steps.

At step S130b, the first display unit 130b is controlled to operate in the first display mode in response to detecting that the movable portion 110b is at the second position with respect to the main body 120b.

The first display unit 130b has a wider display width in a first direction than in a second direction when it is in the first display mode. The first direction is parallel to the long side of the first surface of the main body 120b and perpendicular to the second direction.

The first display unit 130b can be a rectangular display unit having a pair of long sides and a pair of short sides. The long sides of the first display unit 130b are parallel to the long side of the first surface and the short sides of the first display unit 130b are parallel to the short side of the first surface, as shown in FIGS. 1b-4b.

In this first display mode, the first display unit 130b has its long sides as the width of the display region and its short sides as the length of the display region. In this case, the height of the picture displayed in the first display unit 130b is smaller than its width.

In an implementation, the first display unit 130b further has a second display mode. In the second display mode, the height of the picture displayed in the first display unit 130b is equal to the long side of the first display unit and the width of the picture displayed in the first display unit is the short side of the display unit. In this case, the height of the picture displayed in the first display unit 130b is greater than its width.

In this embodiment, when the projection unit 130b is projecting a picture, the long side of the main body is supported on the table. In this way, the first display unit displays in the first display mode, which complies with the user's viewing custom and is convenient for the user's view.

It is to be noted that the steps S130b and 120b are not necessarily performed in any specific order. The step S120b can be performed prior to, simultaneously with, or subsequent to the step S130b.

In an implementation, the content projected by the projection unit 130b is preferably associated with the content displayed in the first display unit. For example, the projected content and the displayed content can be compared with each other, or the projected content can be a control element for the displayed content. Of course, the projected content may alternatively be completely irrelevant to the displayed content.

Fourth Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 5b, the method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

As shown in FIG. 4b, the movable portion 110b further includes a sensor unit 150b and the projected picture includes a virtual operation interface. In FIG. 4b, the virtual operation interface is a virtual keyboard. Alternatively, the virtual operation interface can be an operation interface including a desktop of the electronic device having a number of control icons.

Figure 7B:
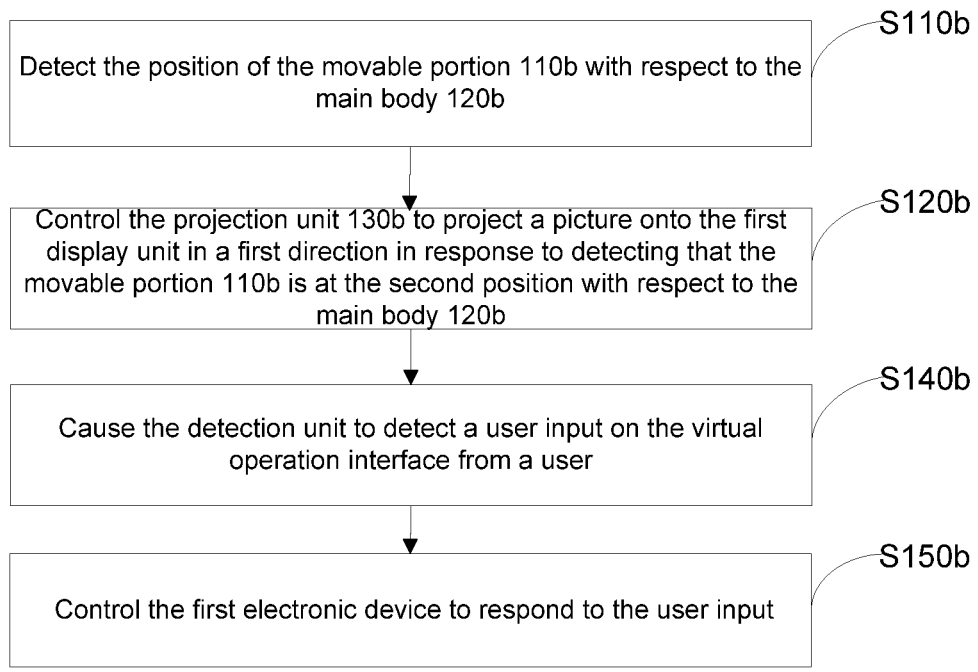

As shown in FIG. 7b, the method further includes the following steps.

At step S140b, the detection unit is caused to detect a user input on the virtual operation interface from a user.

At step S150b, the first electronic device is controlled to respond to the user input.

As shown in FIG. 4b, in this embodiment the projected picture includes a virtual operation interface, which can be a virtual keyboard. The user can click a projected control element in the virtual keyboard to form a user input. In this embodiment, the sensor unit 150b provided in the movable portion 110b can detect the user input on the virtual operation interface and respond to the user input. For example, the sensor unit 150b can be an infrared detection arrangement that detects the user input by detecting the movement of the user's finger on the virtual operation interface.

The electronic device can be a mobile phone or a tablet that is not equipped with a physical keyboard. The virtual operation interface (e.g., virtual keyboard) provided by using the projection unit facilitates the user input. In an implementation, in order to facilitate the user input, the virtual keyboard in this embodiment may have similar key layout and size to those in commonly used notebook or desktop computers. In this way, the convenience in the user operation can be further improved.

Fifth Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 5b, the method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

The step S120b can include: detecting whether a first angle between the movable portion 110b and the main body 120b as formed perpendicularly to the first plane is equal to a predetermined angle; and controlling the projection unit 130b to project the picture onto the first display unit in the first direction when the first angle is equal to the predetermined angle.

When the movable portion 110b is at the second position with respect to the main body 120b, there could be a number of possible angles formed in the second plane and between the movable portion 110b and the main body 120b. However, in this embodiment, the predetermined angle can be a specified angle that can achieve a desired projection effect. For example, it can be ranged from 30° to 60° and is preferably 45°.

Thus, in this embodiment, the projection unit is controlled to project a picture in the step S120b only when the angle in the second plane and between movable portion 110b and the main body 120b is the predetermined angle. In this way, it is possible to provide a better projection effect.

Sixth Method Embodiment

According to this embodiment, an information processing method is provided. The method is applied in a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 5b, the method includes the following steps.

At step S110b, the position of the movable portion 110b with respect to the main body 120b is detected. The first surface and the second surface are both in a first plane when the movable portion 110b is at the first position with respect to the main body 120b. A first portion of the main body 120b and the movable portion 110a support the first electronic device when the movable portion 110b is at the second position with respect to the main body 120b.

At step S120b, the projection unit 130b is controlled to project a picture onto the first display unit in a first direction in response to detecting that the movable portion 110b is at the second position with respect to the main body 120b.

The step S110b can include: detecting a first position parameter of the movable portion 110b and a second position parameter of the main body 120b; and determining the position of the movable portion 110b with respect to the main body 120b based on the first and second position parameters.

There are various schemes for determining the position of the movable portion 110b with respect to the main body 120b. For example, an electronic element, e.g., a photosensitive element can be provided on the interface between the movable portion 110b and the main body 120b to detect the position of the movable portion 110b with respect to the main body 120b based on light intensity. However, in this embodiment, the position of the movable portion 110b with respect to the main body 120b is determined by detecting the first and second position parameters, which can be more accurate.

First Device Embodiment

According to this embodiment, an electronic device is provided. The electronic device is a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

Figure 8B:
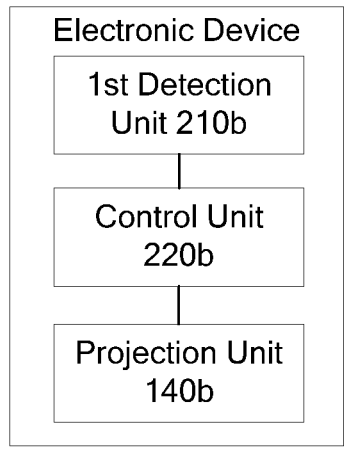

As shown in FIG. 8b, the first electronic device includes the following units.

A first detection unit 210b is configured to detect the position of the movable portion 110b with respect to the main body 120b. The first surface and the second surface are both in a first plane when the movable portion 110b is at the first position with respect to the main body 120b. A first portion of the main body 120b and the movable portion 110b support the first electronic device when the movable portion 110b is at the second position with respect to the main body 120b.

A control unit 220b is configured to control the projection unit 130b to project a picture onto the first display unit 130b in a first direction in response to detecting that the movable portion 110b is at the second position with respect to the main body 120b.

The first electronic device in this embodiment provides a hardware implementation for the method embodiments. For the description of the movable portion 110b, the main body 120b, the first display unit 130b and the projection unit 140b, reference can be made to the above method embodiments and details thereof will be omitted here.

The first detection unit 210b can be any arrangement capable of detecting the positional relation between the movable portion 110b and the main body 120b. For example, it can be a light sensor or a pressure sensor provided on an interface between the movable portion 110b and the main body 120b. The light sensor may detect a minimum ambient brightness when the movable portion 110b is at the first position with respect to the main body 120b, and a maximum ambient brightness when the movable portion 110b is at the second position with respect to the main body 120b. Hence, the light sensor can determine the positional relation between the movable portion 110b and the main body 120b based on the detected ambient brightness. The pressure sensor may detect a maximum pressure applied on it by the movable portion 110b and the main body 120b when the movable portion 110b is at the first position with respect to the main body 120b, and a minimum pressure applied on it by the movable portion 110b and the main body 120b when the movable portion 110b is at the second position with respect to the main body 120b. Hence, the pressure sensor can determine the positional relation between the movable portion 110b and the main body 120b based on the detected pressure.

The control unit 220b can be any of various controllers or a processor or a processing chip having control functions, e.g., Central Processing Unit (CPU), Application Processor (AP), Digital Signal Processor (DSP), Programmable Logic Array (PLA) or other processors having control functions. The processor can execute specified instructions to perform the above operations of the control unit 220b.

With the first electronic device according to this embodiment, the position of the movable portion 110b with respect to the main body 120a in the first electronic device can be detected automatically and the projection unit 140b can be activated automatically. Obviously, it is possible to better utilize the software and hardware resources in the first electronic device, so as to improve the intelligence of the electronic device and the user's satisfaction.

Second Device Embodiment

According to this embodiment, an electronic device is provided. The electronic device is a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 8b, the first electronic device includes the following units.

A first detection unit 210b is configured to detect the position of the movable portion 110b with respect to the main body 120b. The first surface and the second surface are both in a first plane when the movable portion 110b is at the first position with respect to the main body 120b. A first portion of the main body 120b and the movable portion 110b support the first electronic device when the movable portion 110b is at the second position with respect to the main body 120b.

A control unit 220b is configured to control the projection unit 130b to project a picture onto the first display unit 130b in a first direction in response to detecting that the movable portion 110b is at the second position with respect to the main body 120b.

The projection unit 140b can be provided at any position in the movable portion 110b. Preferably, in this embodiment it is at least partially provided on the second surface.

The first portion of the main body 120b that is used for supporting the electronic device can be a portion of the main body 120b that is parallel to the long side of the first surface, as shown in FIG. 2b, a portion of the main body 120b that is parallel to the short side of the first surface, as shown in FIG. 3b. Preferably, in this embodiment it is a portion of the main body 120b that is parallel to the long side of the first surface.

FIG. 4b is a schematic diagram showing a projection by the first electronic device. In this case, the picture can be projected onto a supporting place in front of the first display unit 130b. In this way, when the electronic device is operating, the first display unit 130b can display information and the projection unit 140b can project information, which obviously increases the amount of information that can be displayed simultaneously.

For the relationship between the content displayed by the projection unit 140b and the content displayed by the first display unit 130b, reference can be made to the above method embodiments and details thereof will be omitted here.

In the first electronic device according to this embodiment, the projection unit 140b is provided on the second surface and the control unit 220b controls the projection unit 140b to project a picture when the portion of the main body 120b that is parallel to the long side of the first surface is supporting the electronic device. In this way, the projection posture of the first electronic device can be determined, which can guarantee a better projection effect and satisfy the user requirement to view the picture displayed by the first display unit 130b and the picture projected by the projection unit at the same time.

Further, the first display unit 130b has a first display mode.

The control unit 220b is further configured to control the first display unit 130b to operate in the first display mode in response to detecting that the movable portion 110b is at the second position with respect to the main body 120b.

The first display unit 130b has a wider display width in a first direction than in a second direction when it is in the first display mode. The first direction is parallel to the long side of the first surface of the main body 120b and perpendicular to the second direction.

In this embodiment, the first display mode can also be referred to as a landscape display mode. In the landscape display mode, the width of the displayed picture is greater than its height.

In an implementation, the first display unit 130b has a second display mode. The second display mode can also be referred to as a portrait display mode. In the portrait display mode, the height of the displayed picture is greater than its width.

Obviously, in this embodiment the display mode of the first display unit 130b can be adapted to the posture of the electronic device, which further improves the user's satisfaction with the electronic device.

Third Device Embodiment

According to this embodiment, an electronic device is provided. The electronic device is a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 8b, the first electronic device includes the following units.

A first detection unit 210b is configured to detect the position of the movable portion 110b with respect to the main body 120b. The first surface and the second surface are both in a first plane when the movable portion 110b is at the first position with respect to the main body 120b. A first portion of the main body 120b and the movable portion 110b support the first electronic device when the movable portion 110b is at the second position with respect to the main body 120b.

A control unit 220b is configured to control the projection unit 130b to project a picture onto the first display unit 130b in a first direction in response to detecting that the movable portion 110b is at the second position with respect to the main body 120b.

As shown in FIG. 4b, the movable portion 110b further includes a sensor unit 150b.

The projected picture includes a virtual operation interface, which can be a virtual keyboard as shown in FIG. 4b.

The sensor unit 150b is configured to cause the detection unit to detect a user input on the virtual operation interface from a user.

The control unit 220b is further configured to control the first electronic device to respond to the user input.

In this embodiment, the sensor unit 150b can determine the user input by detecting various gestures the user performs on the virtual operation interface, e.g., the user's action on the virtual keyboard as shown in FIG. 4b. If the sensor unit 150b is an infrared sensor, it can emit infrared rays and detect parameters of the reflected infrared rays. In this case, if the user performs an action similar to a pressing operation on the letter A, the user action on the letter A will affect the amount of infrared rays reflected at the letter A. The infrared sensor can determine that the user has pressed the letter A on the virtual keyboard based on the amount of the reflected infrared rays due to the user operation. In this case, it determines that the user has entered the letter A via the virtual keyboard.

In this embodiment, the control unit 220b is connected to the sensor unit. For the detailed structure of the control unit 220b, reference can be made to the above device embodiments and details thereof will be omitted here.

In this embodiment, the projected picture can be a virtual operation interface. This embodiment is particularly useful for electronic devices that do not have physical keyboards or have small display areas. In this way, the user input can be received via the virtual operation interface, which improves the user's satisfaction with the operation experiences.

Fourth Device Embodiment

According to this embodiment, an electronic device is provided. The electronic device is a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 8b, the first electronic device includes the following units.

A first detection unit 210b is configured to detect the position of the movable portion 110b with respect to the main body 120b. The first surface and the second surface are both in a first plane when the movable portion 110b is at the first position with respect to the main body 120b. A first portion of the main body 120b and the movable portion 110b support the first electronic device when the movable portion 110b is at the second position with respect to the main body 120b.

A control unit 220b is configured to control the projection unit 130b to project a picture onto the first display unit 130b in a first direction in response to detecting that the movable portion 110b is at the second position with respect to the main body 120b.

The control unit 220b is further configured to detect whether a first angle between the movable portion 110b and the main body 120b as formed perpendicularly to the first plane is equal to a predetermined angle and control the projection unit 140b to project the picture onto the first display unit 130b in the first direction when the first angle is equal to the predetermined angle.

There may be a number of angles between the movable portion 110b and the main body 120b in the second plane perpendicular to the first plane. However, there may be only one or few of them that can allow the quality of the picture projected by the projection unit 140b to achieve the desired effect. Hence, in this embodiment, the control unit controls the projection unit 140b to project the picture onto the first display unit 130b in the first direction when the first angle between the movable portion 110b and the main body 120b is equal to the predetermined angle. In this way, it is possible to guarantee a better projection effect.

For example, when the first portion for supporting the first electronic device is a portion of the main body 120b that is parallel to the long side of the first surface, the first angle can be ranged from 30° to 60° and is preferably 45°.

Fifth Device Embodiment

According to this embodiment, an electronic device is provided. The electronic device is a first electronic device including a main body 110b and a movable portion 120b, as shown in FIGS. 1a-4a. The movable portion 110b has a projection unit 130b. The main body 110b includes a first surface having a first display unit. The movable portion 120b includes a second surface and is movable from a first position to a second position with respect to the main body 120b.

As shown in FIG. 8b, the first electronic device includes the following units.

A first detection unit 210b is configured to detect the position of the movable portion 110b with respect to the main body 120b. The first surface and the second surface are both in a first plane when the movable portion 110b is at the first position with respect to the main body 120b. A first portion of the main body 120b and the movable portion 110b support the first electronic device when the movable portion 110b is at the second position with respect to the main body 120b.

A control unit 220b is configured to control the projection unit 130b to project a picture onto the first display unit 130b in a first direction in response to detecting that the movable portion 110b is at the second position with respect to the main body 120b.

The first detection unit 210b is configured to detect a first position parameter of the movable portion 110b and a second position parameter of the main body 120b; and determine the position of the movable portion 110b with respect to the main body 120b based on the first and second position parameters.

In this embodiment, the first detection unit 210b can be one or more sensors, such as gyros, capable of detecting the respective position parameters of the movable portion 110b and the main body 120b. For example, the first detection unit 210b can include a first gyro provided in the movable portion 110b and a second gyro provided in the main body 120b. The first detection unit 210b is configured to determine the position of the movable portion 110b with respect to the main body 120b based on the first position parameter detected by the first gyro and the second position parameter detected by the second gyro.

In this embodiment, the first detection unit is provided to detect the first and second position parameters, such that the detection result can be more accurate.

Sixth Device Embodiment

According to this embodiment, an electronic device is provided. As shown in FIGS. 1b-4b, the electronic device includes a movable portion 110b and a main body 120b. The main body 120b includes a first surface having a first display unit 130b. The movable portion 110b includes a second surface and movable from a first position to a second position with respect to the main body 120b.

The first surface and the second surface are both in a first plane when the movable portion 110b is at the first position with respect to the main body. 120b. A first portion of the main body 120b and the movable portion 110b support the electronic device when the movable portion 110b is at the second position with respect to the main body 120b.

The long side of the second surface of the movable portion 110b has substantially the same length as the short side of the first surface.

The movable portion 11b has a projection unit 140b for project a picture. The projection unit 140b can have any structure capable of projecting a picture, which typically includes a projection light source and a set of lenses. For the structure of the projection unit, reference can be made to conventional projection units provided in portable electronic devices such as mobile phones or tablet computers.

In the electronic device according to this embodiment, the movable portion 110b and the main body 120b are rotatable in a second plane perpendicular to the first plane. During such rotation, the interface between the movable portion 110b and the main body is kept in the second plane. The short side of the first surface can be parallel to the second surface.

The projection unit 140b can be provided at any position in the movable portion 110b, e.g., on the second surface as shown in FIG. 2b, or on an end surface as shown in FIG. 3b.

In this embodiment, the movable portion 110b is movable with respect to the main body 120b. When the movable portion 110b is at the second position with respect to the main body 120b, the first portion of the main body 120b and the movable portion 110b can support the electronic device. In this case, the electronic device can project pictures while being stably supported.

For the description of the movable portion 110b, the main body 120b and the first display unit 130b, reference can be made to the above embodiments and details thereof will be omitted here.

Seventh Device Embodiment

According to this embodiment, an electronic device is provided. As shown in FIGS. 1b-4b, the electronic device includes a movable portion 110b and a main body 120b. The main body 120b includes a first surface having a first display unit 130b. The movable portion 110b includes a second surface and movable from a first position to a second position with respect to the main body 120b.

The first surface and the second surface are both in a first plane when the movable portion 110b is at the first position with respect to the main body. 120b. A first portion of the main body 120b and the movable portion 110b support the electronic device when the movable portion 110b is at the second position with respect to the main body 120b.

The long side of the second surface of the movable portion 110b has substantially the same length as the short side of the first surface.

The movable portion 11b has a projection unit 140b for project a picture.

The first portion of the main body 120b and the movable portion 110b support the first electronic device when the movable portion 110b is at the second position with respect to the main body 120b.

In this embodiment, an end portion of the movable portion 110b and the first portion of the main body 120b support the first electronic device.

The movable portion 110b typically has a bar shape. The end portion is one of the two ends of the bar shaped movable portion 110b.

The first portion of the main body can be a portion parallel to the long side of the first surface, as shown in FIGS. 2b and 4b, or a portion parallel to the short side of the first surface, as shown in FIG. 3b. In this embodiment, it is preferred that it is a portion parallel to the long side of the first surface.

As a further improvement to the first electronic device according to this embodiment, the projection unit 140b is at least partially provided on the second surface, which facilitates the portion of the main body 120b that is parallel to the first surface to support the first electronic device, such that the picture can be projected onto a supporting plane in front of the first display unit 130b.

In this embodiment, the projection unit 140b is located at a position deviated from the middle position of the movable portion 110b. Assuming that the movable portion 110b includes a first end surface and a second end surface, a first distance between the projection unit 140b and the first end surface is not equal to a second distance between the projection unit 140b and the second end surface. The first and second end surfaces are two end surfaces of the movable portion 110b and can support the first electronic device when the movable portion 110b is at the second position with respect to the main body 120b.

Light Emitting Unit as I/O Unit

First Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

Figure 1C:
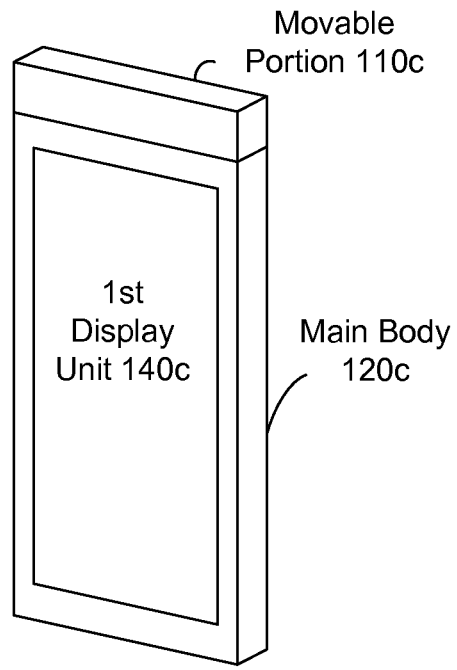
Figure 2C:
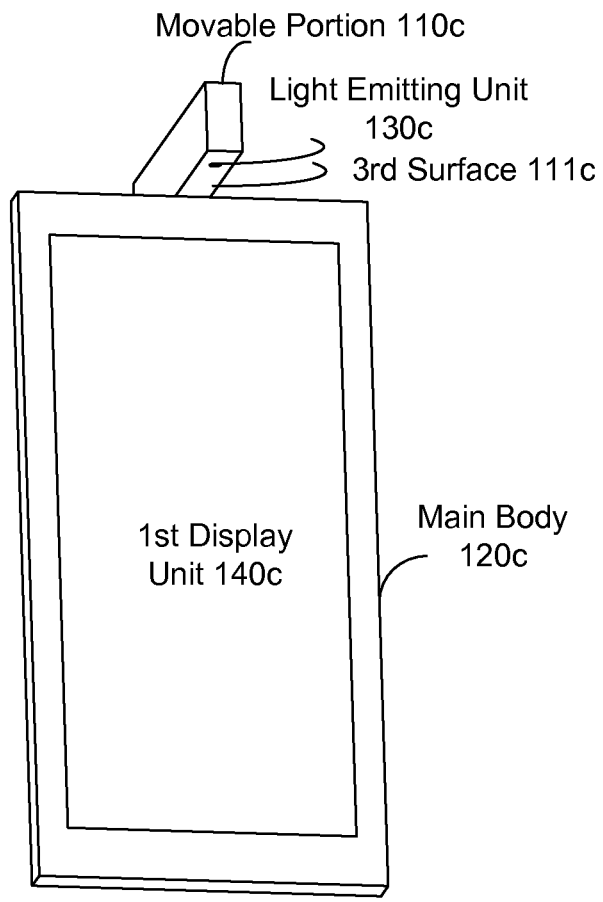

The movable portion has a light emitting unit 130c configured to output light to a display unit (e.g., the first display unit 140c as shown in FIGS. 1c and 2c) of the electronic device.

The electronic device can be a mobile phone, a tablet computer, an e-book, an electronic digital assistant, or the like.

The first display unit 140c can be a Liquid Crystal Display (LCD) unit having a LCD screen or an e-ink display having an e-ink screen. Generally, the first display unit 140c is provided on the first surface or a surface opposite to the first surface.

In this embodiment, the volume of the main body 120c is typically larger than that of the movable portion 110c. The surface of the main body 120c is also larger than that of the movable portion 120c. The number of functional units provided in the main body 120c is greater than the number of functional units provided in the movable portion 110c. Further, the functional complexity of the main body 120c may also be higher than that of the movable portion 110c.

FIG. 1c is a schematic diagram showing the movable portion 110c being at the first position with respect to the main body 120c. FIG. 2a is a schematic diagram showing the movable portion 110c being at the second position with respect to the main body 120c. The light emitting unit 130c can be provided on any of the surfaces of the movable portion 110c and, in the case as shown in FIG. 2c, is provided on a third surface 111c where the movable portion 110c and the main body 120c are interfaced with each other.

The light emitting unit 130c can be a Light Emitting Diode (LED) or any other type of light source, e.g., a cold cathode ray tube light source or an incandescent lamp.

As describe above, the movable portion 110c is movable from a first position to a second position with respect to the main body 120c. Obviously, the electronic device has more postures. Further, the thickness of the electronic device can be reduced by providing the light emitting unit 130c in the movable portion.

Second Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The light emitting unit 130c is configured to output light to the display unit when the movable portion 110c is at the second position with respect to the main body 120c.

The movable portion 110c has at least two positions with respect to the main body 120c: the first position and the second position. In this embodiment, the light emitting unit 130c outputs light when the movable portion 110c is at the second position with respect to the main body 120c, because when the movable portion 110c is at the first position with respect to the main body 120c, the electronic device may not need the light emitting unit 130c to provide light source for display or improve display effect by increasing the brightness.

Generally, the movable portion 110c can has a bar shape and the second surface includes long sides and short sides. For example, the movable portion shown in FIGS. 1c and 2c are rectangular and the second surface includes long sides and short sides.

In this embodiment, the main body 120c is generally rectangular and includes long sides and short sides. In this embodiment, the long side of the second surface of the movable portion 110c has substantially the same length as the short side of the first surface of the main body 120c. Further, the thickness of the movable portion 110c can be equal to, or slightly smaller than, that of the main body 120c.

Figure 3C:
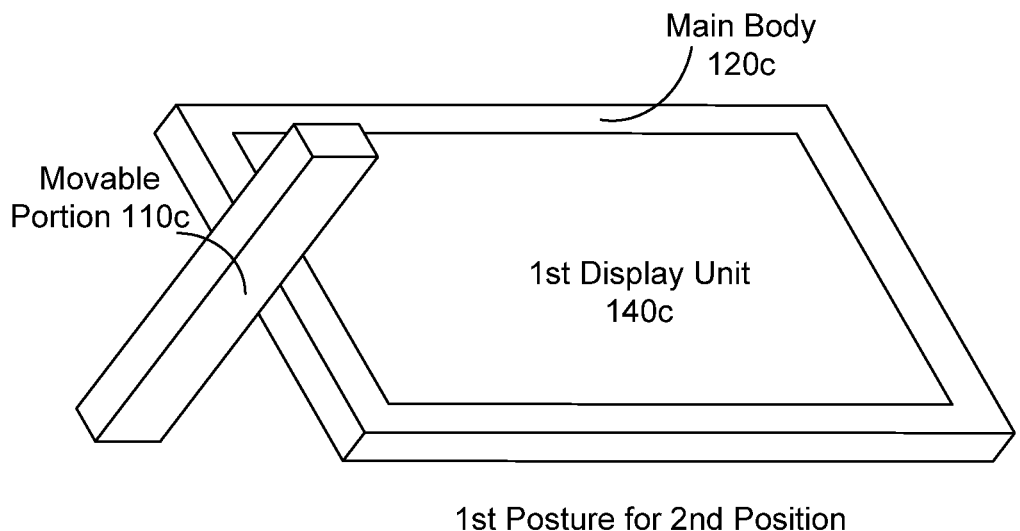
Figure 4C:
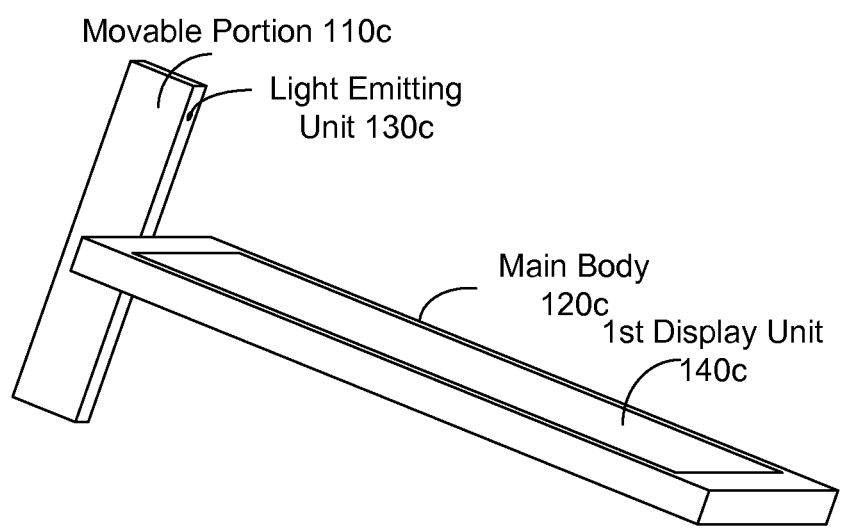

In this embodiment, since the movable portion 110c is movable with respect to the main body 120c, the electronic device has two postures when the movable portion 110c is at the second position with respect to the main body 120c: a first posture as shown in FIG. 3c and a second posture as shown in FIG. 4c.

As shown in FIG. 3c, when the electronic device has the first posture, the movable portion is at the second position with respect to the main body and a first portion of the movable portion and a second portion of the main body can support the electronic device.

In this embodiment, the first portion of the movable portion 110c can be located at an end portion or on a side surface of the movable portion 110c. For example, when the movable portion 11c can be a prism, the second surface can be one side surface of the prism. The end surface can be located on the top or bottom surface of the prism. Generally, the areas of the top and bottom surfaces are smaller than that of the side surface.

Generally, it is located at the portion where the short side of the second surface of the movable portion 110c is located. The second portion is generally a portion of the main body 120c that is parallel to the long side of the first surface.

As shown in FIG. 4c, the electronic device has a second posture.

When the electronic device has the second posture, the movable portion 110c is at the second position with respect to the main body 120c and a first portion of the movable portion 110c and a third portion of the main body 120c can support the electronic device.

When the electronic device has the second posture, the first portion of the movable portion 110c can be one of the two end portions of the movable portion 110c. The third portion can be a portion of the main body 120c that is parallel to the short side of the first surface.

Obviously, in this embodiment, the electronic device can be well supported in either of the two postures. In this embodiment, the light emitting unit 130c is configured to provide a display light to the display unit when the electronic device has the first or second posture.

In this way, it is convenient for the user to view information displayed in the display unit while the electronic device is supported on a supporting plane. The light emitting unit 130c can provide a display light source or increase the display brightness.

Third Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The movable portion 110c includes a third surface 111c, which is kept in a second plane perpendicular to the first plane when the movable portion 111c moves within the second plane. The light emitting unit 130c has at least one portion provided in the third surface 111c.

As shown in FIGS. 2c and 4c, the third surface can be an interface between the movable portion 110c and the main body 120c.

In this way, when the electronic device has the first or second posture as shown in FIG. 3c or 4c, the light emitted by the light emitting unit 130c provided on the third surface 111c can be transmitted to the display unit of the electronic device as much as possible, so as to increase the utilization of the light source.

Fourth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The first electronic device further includes a brightness detection unit configured to detect an ambient brightness of the electronic device. The light emitting unit 130c is configured to output light to the display unit in response to detecting that the ambient brightness is lower than a predetermined brightness.

The brightness detection unit can include one or more photosensitive sensor for detecting the ambient brightness. In a case where the display unit of the electronic device includes an e-ink display unit, when the ambient light is sufficient, the e-ink display unit can display clearly with the ambient light. When the ambient light is insufficient, there may be a problem associated with unclear display if the electronic device is not provided with any display light source. In order to solve this problem, in this embodiment, the light emitting unit 130c outputs light to the display unit when the ambient brightness is lower than the predetermined brightness. For example, a display light source can be provided for an e-ink display unit.

Fifth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The main body 120c further includes a fourth surface opposite to the first surface and having a second display unit. The first and second display units are of different types.

For example, when the first display unit is an e-ink display unit, the second display unit can be a LCD unit or an OLED unit provided on a rear surface of the first display unit in the main body 120c.

Generally, the first display unit can be a monochrome display unit and the second display unit can be a color display unit. The color display unit typically has higher power consumption than the monochrome display unit. In order to save power consumption, the user may select an appropriate display unit for displaying, thereby increasing the battery life. In this embodiment, it is preferred that the power consumption of the second display unit is higher than that of the first display unit.

Sixth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The main body 120c further includes a fourth surface opposite to the first surface and having a second display unit. The first and second display units are of different types.

The electronic device has a first display mode in which the first display unit 140c is in an operating state and the second display unit is in a non-operating state, or a second display mode in which the first display unit 140c is in the non-operating state and the second display unit is in the operating state.

In this embodiment, a display unit being in the non-operating state means that the information displayed in the display unit will not be refreshed. Obviously, by not refreshing the information displayed in the display unit, the power consumption required for driving the display unit to refresh the information. Alternatively, a display unit being in the non-operating state means that not to maintain the display state of the display unit. In an example where the first display unit is a LCD unit, when the first display unit is in the non-operating state, its screen is deactivated.

The display unit can be in any of various non-operating states, e.g., a sleep state of the display unit, as long as the display unit has lower power consumption in the non-operating state than in the operating state.

In this embodiment, while the electronic device is provided with two display units, in order to reduce the power consumption of the electronic device, only one of the display units is in the operating state at a time in a fourth or fifth operation mode. Obviously, this can increase the standby duration of the electronic device.

In this embodiment, the first electronic device has two operation modes, in either of which only one display unit is allowed to be in the operating state. In this way, the power consumption of the electronic device can be saved and the standby duration of the electronic device can be increased.

It is to be noted here that it is possible in practice that the electronic device may have a third operation mode where both the first and second display units are in the operating mode. In this mode, the first and second display units may display the same or different contents.

For example, when the electronic device is in the third operation mode, a first user can view a video on the first display unit on one side of the electronic device, while a second user can view an e-book on the second display unit on another side of the electronic device.

As another example, when the electronic device is in the third operation mode, if a first user and a second user are in a quiet environment such as a library, they can communicate with each other in text by using the electronic device. In this case, the electronic device can be placed in the middle of them, such that they can view the same content on different display units.

Seventh Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The main body 120c further includes a fourth surface opposite to the first surface and having a second display unit. The first and second display units are of different types.

The electronic device has a first display mode in which the first display unit 140c is in an operating state and the second display unit is in a non-operating state, or a second display mode in which the first display unit 140c is in the non-operating state and the second display unit is in the operating state.

Figure 5C:
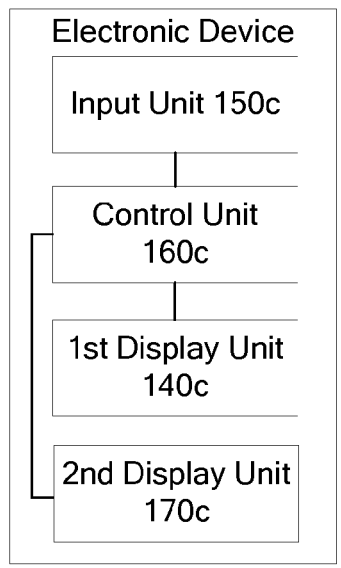
Figure 6C:
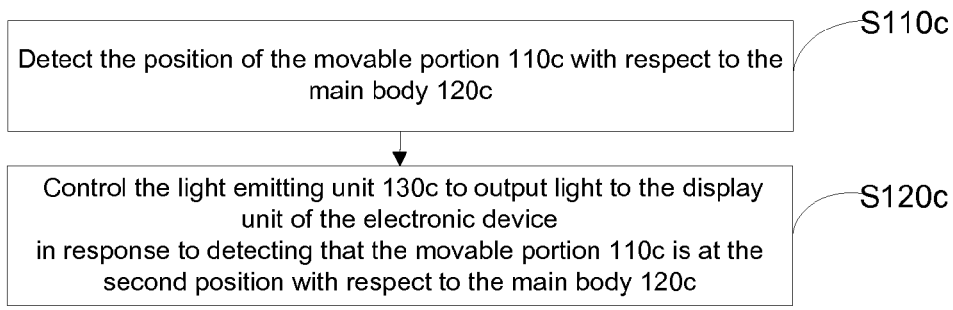
FIGS. 6c and 7c are flowcharts each illustrating an information processing method according to yet another embodiment of the present disclosure.

As shown in FIG. 5c, the electronic device further includes an input unit 150c and a control unit 160c.

The input unit 150c is configured to receive a first input instructing the first display unit 140c to enter the operating state.

The control unit 160c is configured to control the first electronic device to operate in the first display mode in response to the first input.

As a further improvement to this embodiment, the input unit 150c is further configured to receive a second input instructing the second display unit to enter the operating state. The control unit 160c is further configured to control the first electronic device to operate in the second display mode in response to the second input.

In this embodiment, the input unit 150c can be any of various human-machine interfaces, e.g., a keyboard, a mouse, a touch sensitive screen or a hover touch sensitive screen. The input unit can further include an arrangement for voice reception, recognition and parse that receives a voice input as the first input.

The control unit 160c can be any of various processors or processing chips, e.g., Central Processing Unit (CPU), Application Processor (AP), Digital Signal Processor (DSP), Micro Control Unit (MCU), Programmable Logic Array (PLA) or other structures having control functions.

Eighth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The main body 120c further includes a fourth surface opposite to the first surface and having a second display unit. The first and second display units are of different types.

The electronic device has a first display mode in which the first display unit 140c is in an operating state and the second display unit is in a non-operating state, or a second display mode in which the first display unit 140c is in the non-operating state and the second display unit is in the operating state.

As shown in FIG. 5c, the electronic device further includes an input unit 150c and a control unit 160c.

The input unit 150c is configured to receive a first input instructing the first display unit 140c to enter the operating state.

The control unit 160c is configured to control the first electronic device to operate in the first display mode in response to the first input.

The control unit 160c is provided within the main body 120c. The control unit 160c includes a driver module for driving the light emitting unit 130c. With such structure having the control unit 160c and the driver for the light emitting unit 130c are integrated together, the dimension of the electronic device can be further reduced. Meanwhile, the number of control and drive chips can be reduced, so as to reduce the cost.

Ninth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

As shown in FIGS. 1c-4c, the long side of the second surface of the movable portion 110c has substantially the same length as the short side of the first surface.

Tenth Device Embodiment

As shown in FIGS. 1c-2c, an electronic device is provided in this embodiment. The electronic device is a first electronic device including a movable portion 110c and a main body 120c.

The main body 120c includes a first surface. The movable portion 110c includes a second surface.

The movable portion 110c is movable from a first position to a second position with respect to the main body 120c. The first surface and the second surface are both in a first plane when the movable portion 110c is at the first position with respect to the main body 120c. A first portion of the main body 120c and the movable portion 110c can support the first electronic device when the movable portion 110c is at the second position with respect to the main body 120c.

The movable portion has a light emitting unit 130c configured to output light to a display unit of the electronic device.

The long side of the second surface of the movable portion 110c is not shorter than a half of the short side of the first surface and is generally not longer than the short side of the first surface. Typically, the movable portion 110c can have a bar shape and include two end portions both capable of supporting the electronic device to form the postures as shown in FIGS. 3c and 4c.

First Method Embodiment

According to this embodiment, an information processing method is provided. The method is applied in a first electronic device including a main body 110c and a movable portion 120c, as shown in FIGS. 1c-4c and 6c. The main body 110c includes a first surface. The movable portion 120c includes a second surface and is movable from a first position to a second position with respect to the main body 120c. The movable portion 110c has a light emitting unit 130c.

The method includes the following steps.

At step S110c, the position of the movable portion 110c with respect to the main body 120c is detected. The first surface and the second surface are both in a first plane when the movable portion 110c is at the first position with respect to the main body 120c. A first portion of the main body 120c and the movable portion 110c support the electronic device when the movable portion 110c is at the second position with respect to the main body 120c.

At step S120c, in response to detecting that the movable portion 110c is at the second position with respect to the main body 120c, the light emitting unit 130c is controlled to output light to the display unit of the electronic device.

The information processing method according to this embodiment can be applied to the electronic device according to each of the above first to tenth device embodiments. The light emitting unit 130c is controlled to emit light when the movable portion 110c is at the second position with respect to the main body 120c. Obviously, it is possible to better utilize the software and hardware resources in the electronic device, so as to improve the intelligence of the electronic device and the user's satisfaction.

For the description of the display unit, reference can be made to the above first to tenth device embodiments and details thereof will be omitted here.

Second Method Embodiment

According to this embodiment, an information processing method is provided. The method is applied in a first electronic device including a main body 110c and a movable portion 120c, as shown in FIGS. 1c-4c and 6c. The main body 110c includes a first surface. The movable portion 120c includes a second surface and is movable from a first position to a second position with respect to the main body 120c. The movable portion 110c has a light emitting unit 130c.

The method includes the following steps.

At step S110c, the position of the movable portion 110c with respect to the main body 120c is detected. The first surface and the second surface are both in a first plane when the movable portion 110c is at the first position with respect to the main body 120c. A first portion of the main body 120c and the movable portion 110c support the electronic device when the movable portion 110c is at the second position with respect to the main body 120c.

At step S120c, in response to detecting that the movable portion 110c is at the second position with respect to the main body 120c, the light emitting unit 130c is controlled to output light to the display unit of the electronic device.

Figure 7C:
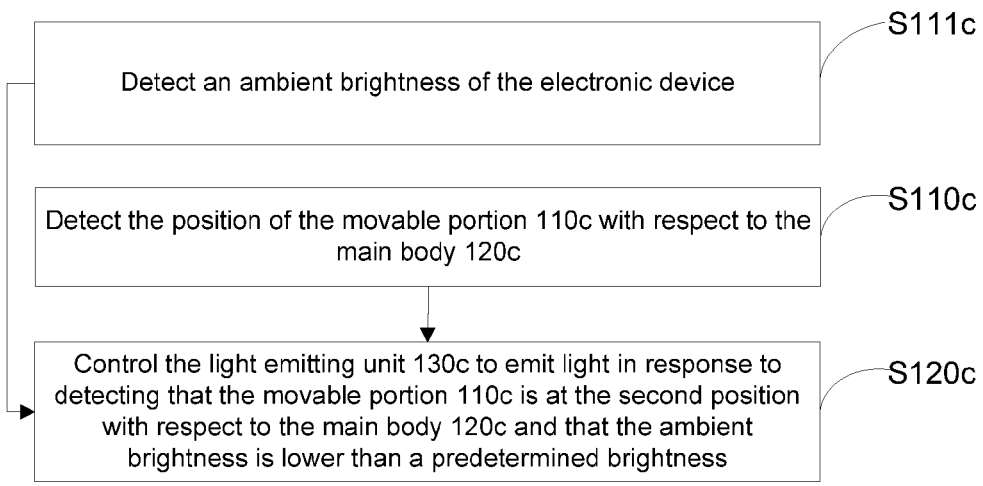

As shown in FIG. 7c, the method further includes a step S111c of detecting an ambient brightness of the electronic device.

The step S120c includes controlling the light emitting unit to emit light in response to detecting that the movable portion is at the second position with respect to the main body and that the ambient brightness is lower than a predetermined brightness.

The method in this embodiment further includes detecting the ambient brightness of the electronic device. When the ambient brightness is sufficient to guarantee that the electronic device can achieve a desired display effect, in order to save the power consumption of the electronic device, the light emitting unit can be maintained in a non-emission state. Thus, in this embodiment, the light emitting unit 130c emits light only when the ambient brightness is lower than the predetermined brightness.

Third Method Embodiment

According to this embodiment, an information processing method is provided. The method is applied in a first electronic device including a main body 110c and a movable portion 120c, as shown in FIGS. 1c-4c and 6c. The main body 110c includes a first surface. The movable portion 120c includes a second surface and is movable from a first position to a second position with respect to the main body 120c. The movable portion 110c has a light emitting unit 130c.

The method includes the following steps.

At step 110c, the position of the movable portion 110c with respect to the main body 120c is detected. The first surface and the second surface are both in a first plane when the movable portion 110c is at the first position with respect to the main body 120c. A first portion of the main body 120c and the movable portion 110c support the electronic device when the movable portion 110c is at the second position with respect to the main body 120c.

At step 120c, in response to detecting that the movable portion 110c is at the second position with respect to the main body 120c, the light emitting unit 130c is controlled to output light to the display unit of the electronic device.

As shown in FIG. 7c, the method further includes a step S111c of detecting an ambient brightness of the electronic device.

The step S120c includes controlling the light emitting unit to emit light in response to detecting that the movable portion 110c is at the second position with respect to the main body 120c and that the ambient brightness is lower than a predetermined brightness.

The step S120c can further include: determining a light emission brightness of the light emitting unit 130c based on the ambient brightness; and controlling the light emitting unit 130c to emit light based on the light emission brightness.

The light emitting unit 130c is configured to provide light to the display unit. The darker the ambient light is, the higher the light emission brightness the light emitting unit 130c needs to provide in order to achieve the desired display effect. If the limit emitting unit 130c keeps emitting light at the same light emission brightness, obviously, when the brightness is too low, the display effect will be affected. On the other hand, if the brightness is too high when the ambient light can provide some brightness, a portion of the light source will be wasted. In this case, the power consumption of the electronic device may be too high.

In order to solve the above problem, the method according to this embodiment further includes determining the light emission brightness of the light emitting unit 130c based on the detected ambient brightness, which further improves the intelligence of the electronic device and the user's satisfaction.

Eleventh Device Embodiment

According to this embodiment, an electronic device is provided. The electronic device includes a main body 110c and a movable portion 120c, as shown in FIGS. 1c-4c. The main body 110c includes a first surface. The movable portion 120c includes a second surface and is movable from a first position to a second position with respect to the main body 120c. The movable portion 110c has a light emitting unit.

Figure 8C:
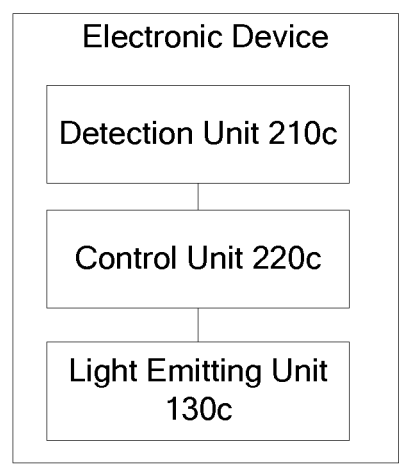

As shown in FIG. 8c, the electronic device includes the following units.

A first detection unit 210c is configured to detect the position of the movable portion 110c with respect to the main body 120c. The first surface and the second surface are both in a first plane when the movable portion 110c is at the first position with respect to the main body 120c. A first portion of the main body 120c and the movable portion 110c support the first electronic device when the movable portion 110c is at the second position with respect to the main body 120c.

A control unit 220c is configured to control the light emitting unit 130c to output light to the display unit of the electronic device in response to detecting that the movable portion 110c is at the second position with respect to the main body 120c.

The detection unit in this embodiment may include any of various sensors for detecting the positional relation between the movable portion 110c and the main body 120c.

Obviously, the tilt of the electronic device varies depending on whether the movable portion 110c has the first or second posture with respect to the main body 120c. The detection unit may be a gyro capable of detecting a direction of an acceleration or speed. Hence, the electronic device has an acceleration or speed when it is switched from one posture to another. A gyro can determine whether the electronic device currently has the first or second posture by detecting a movement parameter of the electronic device as the posture of the electronic device is changed. For the first and second postures, reference can be made to FIGS. 3c and 4c, respectively.

The detection unit 210c can further include one or more light detection units, such as photosensitive resistors, that can be provided on the interface between the movable portion 110c and the main body 120c, e.g., on the third surface. In this way, when the movable portion 110c is at the first position with respect to the main body 120c, no or little ambient light can be detected by the light detection unit.

The control unit 220c can be any of various processors or processing chips, e.g., Central Processing Unit (CPU), Application Processor (AP), Digital Signal Processor (DSP), Micro Control Unit (MCU), Programmable Logic Array (PLA) or other structures having control functions.

The device according to this embodiment is applicable to implement the information processing method according to the first method embodiment and has an advantage that the light emission by the light emitting unit 130c can be controlled intelligently.

It is to be noted that, for the structure of the display unit, reference can be made to the above first to tenth device embodiments and details thereof will be omitted here.

Twelfth Device Embodiment

According to this embodiment, an electronic device is provided. The electronic device includes a main body 110*c* and a movable portion 120*c*, as shown in FIGS. 1*c*-4*c*. The main body 110*c* includes a first surface. The movable portion 120*c* includes a second surface and is movable from a first position to a second position with respect to the main body 120*c*. The movable portion 110*c* has a light emitting unit.

As shown in FIG. 8*c*, the electronic device includes the following units.

A first detection unit 210*c* is configured to detect the position of the movable portion 110*c* with respect to the main body 120*c*. The first surface and the second surface are both in a first plane when the movable portion 110*c* is at the first position with respect to the main body 120*c*. A first portion of the main body 120*c* and the movable portion 110*c* support the first electronic device when the movable portion 110*c* is at the second position with respect to the main body 120*c*.

A control unit 220*c* is configured to control the light emitting unit 130*c* to output light to the display unit of the electronic device in response to detecting that the movable portion 110*c* is at the second position with respect to the main body 120*c*.

The electronic device can further include a sensor unit configured to detect an ambient brightness of the electronic device.

The control unit 220*c* is configured to control the light emitting unit 130*c* to emit light in response to detecting that the movable portion 110*c* is at the second position with respect to the main body 120*c* and that the ambient brightness is lower than a predetermined brightness.

Here, the sensor unit is configured to detect an ambient brightness of the electronic device. It may be a photosensitive sensor. In an implementation, when the electronic device has an image capture unit, the photosensitive element in the image capture unit can be used for detecting the ambient brightness when it is not used for capturing images.

It is to be noted here that, in this embodiment, the sensor unit is preferably a light detection arrangement provided on the outer surface of the electronic device, e.g., the first, second or fourth surface.

Obviously, the sensor unit may have any of various structures and is not limited to the above examples.

For the descriptions of the first, second and fourth surfaces, reference can be made to the above first to tenth device embodiments and details thereof will be omitted here.

As a further improvement to this embodiment, the control unit 220*c* is configured to determine a light emission brightness of the light emitting unit 130*c* based on the ambient brightness and control the light emitting unit to emit light based on the light emission brightness.

The structure of the control unit 220*c* in this embodiment is similar to that of the previous embodiment. In this embodiment, the control unit 220*c* further controls the light emission brightness of the light emitting unit 130*c* based on the ambient brightness. Thus, it is possible to save the power consumption of the electronic device, which in turn increases its standby duration, while guaranteeing its display effect.

For example, the light emitting unit 130*c* may include a number of LEDs. The control unit 220*c* can control the number of the LEDs to emit light, or the brightness of each LED, depending on the ambient brightness, so as to control the light emission brightness of the light emitting unit 130*c*.

It can be appreciated from the embodiments of the present disclosure that the disclosed system, apparatus and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

The integrated units of the present disclosure as described above can be implemented as software functional modules and sold or used as standalone produces. In this case, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium containing instructions which cause a computer device (which can be a personal computer, a server, a network device or the like) or a processor to perform one or more methods according to the embodiments of the present disclosure or particular parts thereof. The storage medium may be any of various mediums capable of storing program codes, such as a USB disk, a hard disk, a Read Only Memory (ROM), a Random Access Memory (RAM), a magnetic disk or an optical disc.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

What is claimed is:

1. An electronic device, comprising:
   a main body comprising a first surface having a first display unit arranged thereon; and
   a movable portion comprising a second surface and movable from a first position to a second position with respect to the main body,
   wherein, the first surface and the second surface are both in a first plane when the movable portion is at the first position with respect to the main body, and a first portion of the main body and the movable portion support the electronic device when the movable portion is at the second position with respect to the main body, and wherein the movable portion has an Input/Output (I/O) unit arranged thereon;

wherein the I/O unit comprises a first image capture unit configured to capture an image when the movable portion is at the second position with respect to the main body; and wherein the movable portion further comprises a second image capture unit that is provided at least partially on the second surface.

2. The electronic device of claim 1, further comprising:
a communication unit configured to transmit a first image captured by the first capture unit to a second electronic device and receive a second image from the second electronic device, wherein the first display unit comprises a first display region for displaying the first image and a second display region for displaying the second image.

3. The electronic device of claim 1, wherein
the electronic device has a first posture or a second posture when the movable portion is at the second position,
the first portion of the main body and the movable portion support the electronic device when the electronic device has the first posture, the first portion being a portion of the main body that is parallel to a long side of the first surface,
a second portion of the main body and the movable portion support the electronic device when the electronic device has the second posture, the second portion being a portion of the main body that is parallel to a short side of the first surface.

4. The electronic device of claim 3, wherein the first display unit has a first display mode or a second display mode, and the electronic device further comprises:
a first detection unit configured to detect whether the electronic device has the first posture or the second posture, and
a control unit configured to control the first display unit to operate in the first display mode when the electronic device has the first posture or in the second display mode when the electronic device has the second posture.

5. The electronic device of claim 1, wherein the first image capture unit comprises a first photosensitive unit and the second image capture unit comprises a second photosensitive unit, and the electronic device further comprises:
an imaging unit connected to the first and second photosensitive units.

6. An electronic device, comprising:
a main body comprising a first surface having a first display unit arranged thereon; and
a movable portion comprising a second surface and movable from a first position to a second position with respect to the main body, wherein, the first surface and the second surface are both in a first plane when the movable portion is at the first position with respect to the main body, and a first portion of the main body and the movable portion support the electronic device when the movable portion is at the second position with respect to the main body, and wherein the movable portion has an Input/Output (I/O) unit arranged thereon; and wherein the I/O unit comprises a projection unit configured to project a picture onto the first display unit in a first direction when the movable portion is at the second position with respect to the main body.

7. The electronic device of claim 6, wherein the projection unit is provided at least partially on the second surface and the first portion being a portion of the main body that is parallel to a long side of the first surface.

8. The electronic device of claim 6, wherein the movable portion comprises a sensor unit and the projected picture comprises a virtual operation interface, and
the sensor unit is configured to detect a user input on the virtual operation interface from a user.

9. The electronic device of claim 6, wherein the projection unit is configured to project the picture onto the first display unit in the first direction when a first angle between the movable portion and the main body as formed perpendicularly to the first plane is equal to a predetermined angle.

10. An electronic device, comprising:
a main body comprising a first surface having a first display unit arranged thereon; and
a movable portion comprising a second surface and movable from a first position to a second position with respect to the main body, wherein, the first surface and the second surface are both in a first plane when the movable portion is at the first position with respect to the main body, and a first portion of the main body and the movable portion support the electronic device when the movable portion is at the second position with respect to the main body, and wherein the movable portion has an Input/Output (I/O) unit arranged thereon;

wherein the I/O unit comprises a light emitting unit configured to output light to the first display unit when the movable portion is at the second position with respect to the main body.

11. The electronic device of claim 10, wherein
the movable portion comprises a third surface which is in a second plane perpendicular to the first plane when the movable portion moves within the second plane, and
the light emitting unit has at least one portion provided on the third surface.

12. The electronic device of claim 11, wherein the main body further comprises a fourth surface opposite to the first surface and having a second display unit arranged thereon, and wherein the first and second display units are of different types.

13. The electronic device of claim 12, wherein the electronic device has a first display mode in which the first display unit is in an operating state and the second display unit is in a non-operating state, or a second display mode in which the first display unit is in the non-operating state and the second display unit is in the operating state, and the electronic device further comprises:
an input unit configured to receive a first or second input instructing the first or second display unit to enter the operating state; and
a control unit configured to control the electronic device to operate in the first or second display mode in response to the first or second input.

14. An information processing method, applied in an electronic device comprising a main body and a movable portion, the main body comprising a first surface having a first display unit arranged thereon, the movable portion comprising a second surface and movable from a first position to a second position with respect to the main body, the movable portion having an Input/Output (I/O) unit arranged thereon, the method comprising:

detecting a position of the movable portion with respect to the main body, wherein the first surface and the second surface are both in a first plane when the movable portion is at the first position with respect to the main body, and a first portion of the main body and the movable portion support the electronic device when the movable portion is at the second position with respect to the main body, and activating the I/O unit in response to detecting that the movable portion is at the second position with respect to the main body;

wherein the I/O unit comprises a projection unit and said activating the I/O unit comprises:

detecting whether a first angle between the movable portion and the main body as formed perpendicularly to the first plane is equal to a predetermined angle; and controlling the projection unit to project a picture onto the first display unit in a first direction when the first angle is equal to the predetermined angle.

15. The method of claim 14, wherein the projection unit is provided at least partially on the second surface and the first portion being a portion of the main body that is parallel to a long side of the first surface.

16. The method of claim 14, wherein the movable portion further comprises a sensor unit and the projected picture comprises a virtual operation interface, and the method further comprises:

detecting, by the sensor unit, a user input on the virtual operation interface from a user;

controlling the electronic device to respond to the user input.

17. An information processing method, applied in an electronic device comprising a main body and a movable portion, the main body comprising a first surface having a first display unit arranged thereon, the movable portion comprising a second surface and movable from a first position to a second position with respect to the main body, the movable portion having an Input/Output (I/O) unit arranged thereon, the method comprising:

detecting a position of the movable portion with respect to the main body, wherein the first surface and the second surface are both in a first plane when the movable portion is at the first position with respect to the main body, and a first portion of the main body and the movable portion support the electronic device when the movable portion is at the second position with respect to the main body, and activating the I/O unit in response to detecting that the movable portion is at the second position with respect to the main body;

wherein the I/O unit comprises a light emitting unit, said activating the I/O unit comprises:

detecting an ambient brightness of the electronic device; and activating the light emitting unit in response to detecting that the movable portion is at the second position with respect to the main body and that the ambient brightness is lower than a predetermined brightness.

18. The method of claim 17, further comprising:

determining a light emission brightness of the light emitting unit based on the ambient brightness; and controlling the light emitting unit to emit light based on the light emission brightness.

\* \* \* \* \*